US007264360B2

(12) United States Patent
Hatakeyama et al.

(10) Patent No.: US 7,264,360 B2
(45) Date of Patent: Sep. 4, 2007

(54) SCAN TYPE DISPLAY OPTICAL SYSTEM

(75) Inventors: Koshi Hatakeyama, Tochigi (JP);
Toshihiro Sunaga, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/781,533

(22) Filed: Feb. 17, 2004

(65) Prior Publication Data

US 2004/0223126 A1   Nov. 11, 2004

(30) Foreign Application Priority Data

Feb. 18, 2003   (JP)   ............................. 2003-040411

(51) Int. Cl.
*G03B 21/28* (2006.01)
*G02B 26/10* (2006.01)
(52) U.S. Cl. ..................... 353/99; 353/50; 359/197; 359/201
(58) Field of Classification Search ............... 353/37, 353/34, 69, 70, 87, 97–99, 122, 94, 50; 359/197, 359/198, 212, 201; 348/770, 771, 785; *G03B 21/28*
See application file for complete search history.

(56) References Cited

U.S. PATENT DOCUMENTS

| 5,606,447 | A |   | 2/1997 | Asada et al. | |
|---|---|---|---|---|---|
| 5,767,666 | A |   | 6/1998 | Asada et al. | |
| 5,820,240 | A |   | 10/1998 | Ohzawa | |
| 5,822,022 | A | * | 10/1998 | Deter et al. ................ | 348/750 |
| 5,835,252 | A |   | 11/1998 | Meier et al. ................ | 359/201 |
| 5,982,525 | A |   | 11/1999 | Matsubara et al. ......... | 359/212 |
| 6,123,425 | A |   | 9/2000 | Ohzawa | |
| 6,208,468 | B1 | * | 3/2001 | Togino et al. .............. | 359/637 |
| 6,264,333 | B1 |   | 7/2001 | Iizuka | |
| 6,351,324 | B1 | * | 2/2002 | Flint .......................... | 359/202 |
| 6,577,429 | B1 | * | 6/2003 | Kurtz et al. ................ | 359/279 |
| 6,590,606 | B1 |   | 7/2003 | Hiller et al. ................ | 348/203 |
| 6,626,541 | B2 | * | 9/2003 | Sunaga ........................ | 353/69 |
| 6,626,542 | B2 | * | 9/2003 | Baba et al. .................. | 353/98 |
| 6,670,603 | B2 | * | 12/2003 | Shimada et al. ............ | 250/235 |

(Continued)

FOREIGN PATENT DOCUMENTS

DE   196 41 656 A1   5/1998

(Continued)

OTHER PUBLICATIONS

Meaning of Vibrate, Hyperdictionary, printed Aug. 24, 2006 http://www.hyperdictionary.com/search.aspx?define=vibrate.*

(Continued)

*Primary Examiner*—Andrew T. Sever
(74) *Attorney, Agent, or Firm*—Morgan & Finnegan LLP

(57) ABSTRACT

A scan type display optical system is disclosed in which the position and inclination of an image formed by projection light is made variable. The scan type display optical system comprises an optical scanning member for deflecting and scanning light, and a projection optical system which includes a plurality of optical surfaces containing a reflective surface. The projection optical system projects light from the optical scanning member. An incidence range of light from the optical scanning member to a first optical surface on which the light is incident initially out of the plurality of optical surfaces is variable.

9 Claims, 28 Drawing Sheets

U.S. PATENT DOCUMENTS

| | | | |
|---|---|---|---|
| 6,755,536 B2* | 6/2004 | Tegreene et al. | 353/94 |
| 6,819,468 B2* | 11/2004 | Dho | 359/279 |
| 6,900,918 B2* | 5/2005 | Orcutt et al. | 359/224 |
| 2002/0191161 A1* | 12/2002 | Baba et al. | 353/98 |
| 2002/0196377 A1* | 12/2002 | Furukawa et al. | 348/742 |
| 2003/0039036 A1* | 2/2003 | Kruschwitz et al. | 359/707 |
| 2003/0067590 A1* | 4/2003 | Shin | 353/99 |
| 2004/0036984 A1* | 2/2004 | Nakamura | 359/726 |

FOREIGN PATENT DOCUMENTS

| | | |
|---|---|---|
| DE | 100 35 040 A1 | 2/2002 |
| EP | 0 062 729 A1 | 10/1982 |
| EP | 0 576 014 | 12/1993 |
| EP | 0 686 863 A1 | 12/1995 |
| EP | 0 062 729 A1 | 1/1996 |
| EP | 1 139 145 A2 | 3/2001 |
| EP | 1 139 145 A2 | 10/2001 |
| JP | H5(1993)-80418 | 4/1993 |
| JP | H5(1993)-100312 | 4/1993 |
| JP | H6(1994)-295159 | 10/1994 |
| JP | 7-140457 | 2/1995 |
| JP | H7(1995)-175005 | 7/1995 |
| JP | H7(1995)-218857 | 8/1995 |
| JP | H8(1996)-292371 | 11/1996 |
| JP | H8(1996)-292372 | 11/1996 |
| JP | H9(1997)-5650 | 1/1997 |
| JP | H9(1997)-222561 | 8/1997 |
| JP | H9(1997)-304733 | 11/1997 |
| JP | H10(1998)-282451 | 10/1998 |
| JP | 2000-35549 | 2/2000 |
| JP | 2000-89227 | 3/2000 |
| JP | 2001-255462 | 9/2001 |
| JP | 2001-281583 | 10/2001 |
| WO | WO95/20774 | 8/1995 |
| WO | WO 95/20774 | 8/1995 |
| WO | WO97/01787 | 1/1997 |
| WO | 99/11062 | 3/1999 |

OTHER PUBLICATIONS

English Abstract of H9(1997)-304733 (Item A), no date see above.
English Abstract of H10(1998)-282451 (Item B), no date.
English Abstract of H5(1993)-100312 (Item C), no date.
English Abstract of H5(1993)-80418 (Item D), no date.
English Abstract of H9(1997)-5650 (Item E), no date.
English Abstract of H8(1996)-292371 (Item F), no date.
English Abstract of H8(1996)-292372 (Item G), no date.
English Abstract of H9(1997)-222561 (Item H), no date.
English Abstract of 2001-255462 (Item I), no date.
English Abstract of 2000-89227 (Item J), no date.
English Abstract of H6(1994)-295159 (Item K), no date.
English Abstract of 2000-35549 (Item L), no date.
English Abstract of WO 95/20774 (Item M), no date.
English Abstract of H7(1995)-175005 (item N), no date.
English Abstract of H7(1995)-218857 (Item O), no date.
English Abstract of WO 95/20774 (Item 17), no date.
Smith, Warren J., "Modern Lens Design", A Resource Manual, par. 22.2; McGraw-Hill, 1992.
Sand, Rüdiger, Laser-TV, (k)eine Erfindung des "tapferen Schneiderleins", FKT Fernseh-und Kino-Technik, pp. 561, 562, vol. 47, No. 9, Sep. 1993.
EP Office Action for Application No. 04 250 836.6 dated Dec. 11, 2006.

* cited by examiner

SCAN TYPE DISPLAY OPTICAL SYSTEM

BACKGROUND OF THE INVENTION

1. Field of the Invention

The present invention relates to a scan type display optical system and a scan type image display apparatus for displaying an image by deflecting and scanning light.

2. Description of Related Art

An optical system in which a screen serving as a face to be projected can be subjected to projection from a slant direction to shorten the distance between the screen and a projector has been proposed as one projection optical system used for projectors. However, projection of an image to the screen from the slant direction induces trapezoidal distortion to the image. Therefore, various proposals for correcting the trapezoidal distortion have been made.

The following Patent Document 1 has proposed a projection optical system in which a lens group is rotated and decentered with a diaphragm as the center by using a coaxial rotational symmetrical f-θ lens to rotate an image surface in a state where there is no trapezoidal distortion of the image.

Furthermore, the following Patent Document 2 has proposed a projection optical system for correcting the trapezoidal distortion at a fixed projection angle by using a decentered aspheric surface.

In an embodiment of an optical system proposed in the following Patent Document 3, a wide-angle lens having a wide field angle is used as a projection optical system, a light valve and a screen are shifted with respect to the optical axis of the projection optical system and projection is carried out by using the end portion of the field angle to thereby construct a slant projection type optical system.

In an embodiment of an optical system proposed in the following Patent Document 4, light is projected slantwise to the screen by inclining first and second projection optical systems with respect to the optical axis.

In a non-axial optical system, Patent Document 5 discloses a designing method and a calculation method of a paraxial amount such as a focusing distance or the like, and Patent Documents 6, 7 and 8 disclose design examples thereof. In these publications, a "reference axis" concept is introduced, and a constituent plane is set to an asymmetric aspheric surface, thereby constructing an optical system for which aberration is sufficiently corrected.

The non-axial optical system as described above is called an Off-Axial optical system. When considering a reference axis along a light ray passing through the center of an image and the center of a pupil, the Off-Axial optical system is defined as an optical system containing a curved surface (Off-Axial curved surface) on which a surface normal at the cross point between the constituent plane and the reference axis is not on the reference axis. In the Off-Axial optical system, the reference axis has a zigzagged shape.

With respect to the Off-Axial optical system, the constituent plane generally becomes non-axial, and no shading occurs even on the reflective surface, so that an optical system using the reflective surface can be easily constructed. Furthermore, by forming an intermediate image in the optical system, an optical system which is compact irrespective of a wide field angle can be designed. The Off-Axial optical system is a front-diaphragm type optical system, but it can be constructed as a compact optical system because the optical path thereof can be relatively freely routed.

By actively using these, Patent Document 9 and Patent Document 10 have proposed a projection optical system for correcting trapezoidal distortion at a fixed projection angle by using a rotational asymmetric reflective surface having curvature.

Furthermore, Patent Document 11 has proposed a technique for secondarily scanning a laser ray with a rotational polygonal mirror to display an image. In this case, by properly setting the timing of intensity modulation of the laser ray, distortion which cannot be removed by the optical system can be corrected.

Patent Document 12 has proposed a projection optical system for carrying out slant projection by using a plurality of reflective surfaces.

Furthermore, an optical device for scanning incident light by deflecting the incident light has been proposed by Patent Documents 13 to 15.

FIG. 28 shows the construction of a planar type galvanomirror proposed in Patent Document 13. Specifically, a planar movable plate 105 and a torsion bar 106 for supporting the movable plate 105 in a movable manner are integrally formed on a silicon substrate 102. A planar coil 107 which is supplied with current to generate magnetic field is equipped at the peripheral edge portion of the upper surface of the movable plate 105, and a reflection mirror 108 is equipped at the center portion on the upper surface surrounded by the planar coil 107. Furthermore, glass substrates 103 and 104 are equipped on the upper and lower surfaces of the silicon substrate 102, and permanent magnets 110A, 110B and 111A and 111B for acting a magnetic field on the planar coil 107 are fixed at predetermined positions of the glass substrates 103 and 104.

[Patent Document 1] Japanese Patent Application Laid-Open No. H9(1997)-304733

[Patent Document 2] Japanese Patent Application Laid-Open No. H10(1998)-282451

[Patent Document 3] Japanese Patent Application Laid-Open No. H5(1993)-100312

[Patent Document 4] Japanese Patent Application Laid-Open No. H5(1993)-80418

[Patent Document 5] Japanese Patent Application Laid-Open No. H9(1997)-5650

[Patent Document 6] Japanese Patent Application Laid-Open No. H8(1996)-292371

[Patent Document 7] Japanese Patent Application Laid-Open No. H8(1996)-292372

[Patent Document 8] Japanese Patent Application Laid-Open No. H9(1997)-222561

[Patent Document 9] Japanese Patent Application Laid-Open No. 2001-255462 (corresponding to U.S. Pat. No. 6,626,541 and EP 1 139 145 A2)

[Patent Document 10] Japanese Patent Application Laid-Open No. 2000-89227

[Patent Document 11] Japanese Patent Application Laid-Open No. H6(1994)-295159

[Patent Document 12] PCT Publication No. WO 97/1787

[Patent Document 13] Japanese Patent Application Laid-Open No. H7(1995)-175005 (corresponding to U.S. Pat. No. 5,606,447 and EP 0 686 863 A1)

[Patent Document 14] Japanese Patent Application Laid-Open No. H7(1995)-218857 (corresponding to PCT Publication No. WO 95/20774, U.S. Pat. No. 5,767,666 and EP 0 062 729 A1)

[Patent Document 15] Japanese Patent Application Laid-Open No. 2000-35549

The Patent Document 1 proposes a projection optical system containing a combination of coaxial rotational symmetric f-θ optical systems is proposed in Patent Document 1, however, it is difficult to apply this projection optical system to a normal projector, etc., because the field angle is narrow.

In the case of normal lenses, as the field angle is increased from the optical axis, the light amount is reduced. Therefore, as a lens system having a wide field angle is more frequently used, the difference in brightness on the image surface is increased more and more. Therefore, the projection optical system proposed by Patent Document 1 is unsuitable for a projector to which a wide field angle and a bright image surface are required.

The projection optical system proposed by Patent Document 2 corrects the trapezoidal distortion by the decentered aspheric surface, however, it can correct the trapezoidal distortion at a fixed projection angle, so that the degree of freedom of the setup position of the projector is lost. Furthermore, from the point of view that the shift amount of the screen is small and it is not telecentric to a liquid crystal panel, this projection optical system is also unsuitable for the projector.

In the projection optical systems proposed in Patent Document 9 and Patent Document 10, the trapezoidal distortion of the wide field angle is corrected by using the rotational asymmetric reflective surface having curvature. However, these systems can correct the trapezoidal distortion only at some fixed projection angle, and the degree of freedom of the setup position of the projector is lost.

In the case of the projection optical system in which the light valve and the screen are shifted with respect to the optical axis as proposed in Patent Document 3, a high field-angle lens system which covers an extremely large field angle is required as a lens system to be used. In addition, when the optical axis is set to approach to the center of the screen, an image is not focused on the screen in the normal lens system, and it is focused on the plane vertical to the optical axis.

When the projection optical system is constructed as described above, as well known, an image is distorted in a trapezoidal shape, and it is out of focus at the upper and lower sides of the screen. When inclination of the image surface is corrected, the correction must be carried out so as to offset the difference between the optical path of a ray passing through the upper portion of the screen and the optical path of a ray passing through the lower portion of the screen. When this optical path difference is corrected, the optical path difference can be reduced if the correction can be carried out in the neighborhood of the image-forming surface, and thus the correction amount can be small. On the other hand, when the correction is carried out on the optical plane at the screen side on which an image is enlarged, the optical path difference has a direct effect.

Furthermore, in the projection optical system proposed in Patent Document 4, the lens system is merely tilted, and thus it is difficult to tilt the image surface sufficiently. Furthermore, when the tilt amount is excessively large, it is difficult to secure the optical performance.

In the optical system proposed in Patent Document 12, the size of one reflective surface is large, and it is difficult to manufacture the optical system with high precision.

In the method of scanning a point light source or a one-dimensional image display element for display by a rotational polygonal mirror, a galvanomirror or the like as disclosed in Patent Document 11 or the like, when electrical correction is impossible, the projection optical system must have the characteristic of a f-θ lens or arcsine lens.

When a one-dimensional image display device is used, it is required to have the characteristic of the f-θ lens, the arcsine lens or the like in the scanning direction and the characteristic of the normal camera lens in the non-scanning direction vertical to the scanning direction. That is, it is required to have a characteristic which is asymmetrical with respect to the optical axis.

SUMMARY OF THE INVENTION

The present invention has an object to provide a scan type display optical system which makes it possible to vary the position and inclination of an image formed by projected light, and a scan type image display apparatus having the scan type display optical system.

In order to attain the above object, a scan type display optical system according to one aspect of the present invention is equipped with an optical scanning member for deflecting and scanning light, and a projection optical system having a plurality of optical surfaces containing a reflective surface for projecting light from the optical scanning member. With respect to light incident from the optical scanning member to the projection optical system, the incident range of the light to the first optical surface out of the plurality of optical surfaces is made variable.

The feature of the scan type display optical system and the scan type image display apparatus according to the present invention will be clarified by description of the following specific embodiments with reference to the drawings.

DETAILED DESCRIPTION OF THE PREFERRED EMBODIMENTS

Embodiments according to the present invention will be described with reference to the drawings. First, the method of representing the specifications of constituent elements of the embodiments and the common items of the embodiments will be described.

Figure 1:
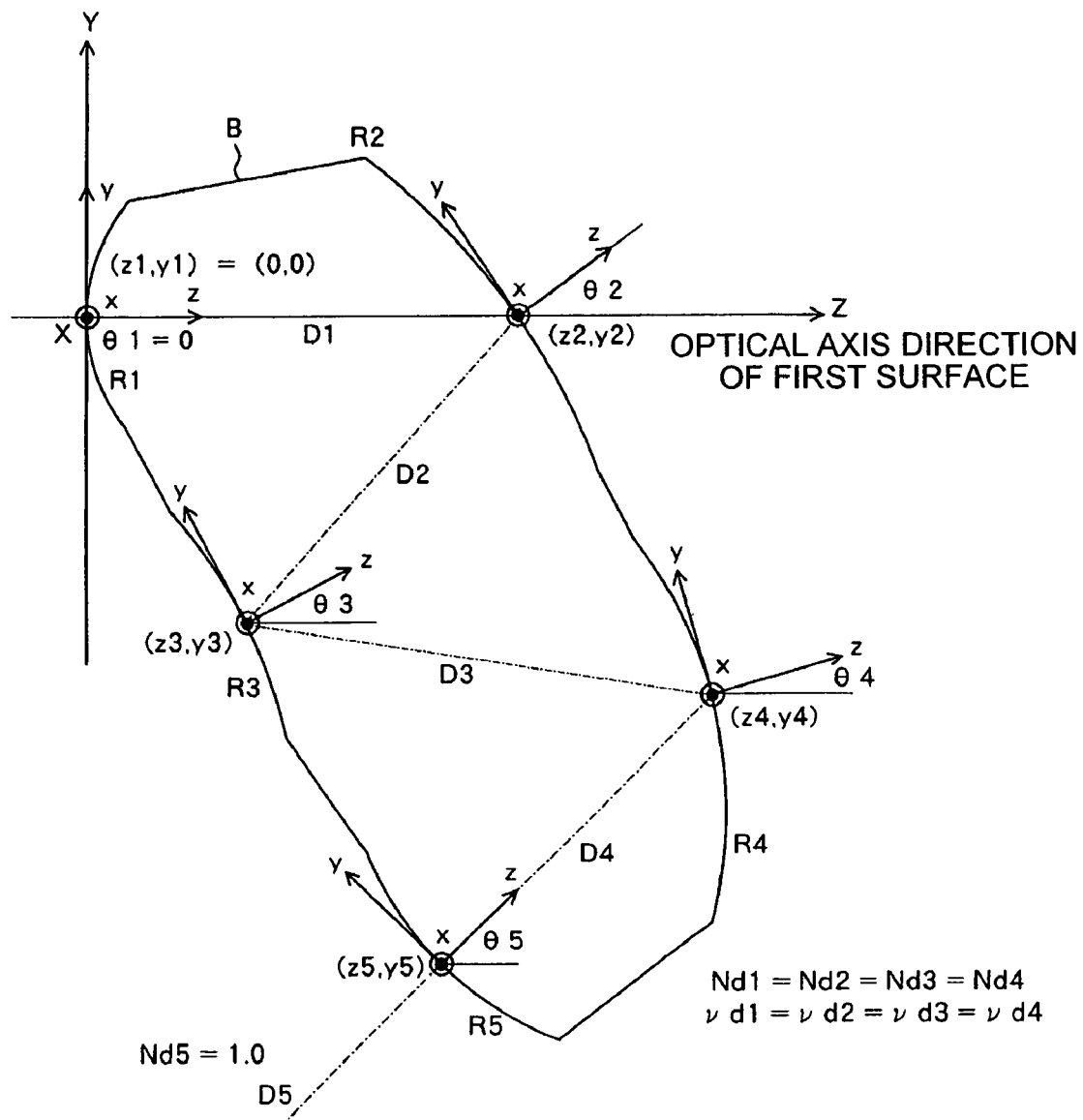
FIG. 1 is a diagram showing the coordinate system of the embodiments of the present invention.

FIG. 1 is a diagram showing the coordinate system for defining constituent data of the optical system according to an embodiment. In this embodiment, an i-th surface is set as an i-th surface along a light ray (represented by a dashed line in FIG. 1, and hereinafter referred to as a reference axis ray) propagating from an object side through the center of an image surface.

In FIG. 1, a first surface R1 is a refractive surface, a second surface R2 is a reflective surface tilted with respect to the first surface R1, third surface R3 and fourth surface R4 are reflective surfaces which are shifted and tilted with respect to the respective front surfaces, and a fifth surface R5 is a refractive surface which is shifted and tilted with respect to the fourth surface R4.

Each of the surfaces from the first surface R1 to the fifth surface R5 is constructed on one optical element formed of a medium such as glass, plastic or the like, and it is set as a first optical element B in FIG. 1.

Accordingly, in the structure of FIG. 1, the medium from an object surface (not shown) to the first surface R1 is formed of air, the medium from the first surface R1 to the fifth surface R5 is formed of some common optical medium, and the medium from the fifth surface R5 to a sixth surface (image surface) R6 is formed of air.

The optical system of this embodiment is an Off-Axial optical system, and thus each surface constituting the optical system has no common optical axis. Therefore, in this embodiment, the absolute coordinate system containing the center point of the first surface as the original point is first set.

Furthermore, in this embodiment, the center point of the first surface is set as the original point, and the path of the reference axis ray corresponding to the ray passing through the original point and the center of the final image-forming surface is defined as the reference axis of the optical system. Furthermore, the reference axis in this embodiment has a direction (orientation). The direction corresponds to the direction along which the reference axis ray travels during image-formation.

In this embodiment, the reference axis serving as the reference of the optical system is set as described above. However, as a method of determining an axis serving as the reference of the optical system, the axis may be selected so that it is convenient for optical design, setting of aberration or representation of each surface shape constituting the optical system. However, in general, the path of the ray passing through the center of the image surface and any one of the aperture stop, entrance pupil, exit pupil, the center of the first surface of the optical system or the center of the final surface may be set as the reference axis.

That is, in this embodiment, the path along which the light ray (reference axis ray) passing through the center point of the first surface to the center of the final image-forming surface is refracted and reflected by each refraction surface and the reflective surface is set as the reference axis. The order of the respective surfaces is set in the order of the refraction/reflection of the reference axis ray.

Accordingly, the reference axis finally reaches the center of the image surface while the direction thereof is varied according to the rule of refraction or reflection along the order of each of the set surfaces. Furthermore, in this embodiment, an object surface side, a panel surface side, an effective projection surface side, an image surface side, etc., means the side at which these surfaces are located with respect to the direction of the reference axis.

Each axis of the absolute coordinate system of the optical system in this embodiment is defined as follows.

Z axis: a straight line passing through the original point and the center of the object surface. The direction from the object surface to the first surface R1 is set as positive.

Y axis: a straight line passing through the original point and counterclockwise rotated from the Z axis by 90 degrees according to the definition of the right-hand coordinate system.

X axis: a straight line passing through the original point and vertical to each of the Z axis and the Y axis.

In order to represent the surface shape and tilt angle of the i-th surface constituting the optical system, it is more easily understandable to recognize the shape by setting a local coordinate system containing the cross point between the reference axis and the i-th surface as the original point, representing the surface shape of the surface in the local coordinate system and representing the tilt angle by the angle formed between the reference axis and the local coordinate system than by representing the shape and tilt angle of the surface in the absolute coordinate system. Therefore, the surface shape of the i-th surface is represented by the following local coordinate system. Therefore, the following on-reference-axis coordinate system is first set for any point on the reference axis.

zb axis: a straight line which passes through any point on the reference axis and in which the direction of the reference axis is set as positive. The incident direction is set as positive at a deflection point of the reference axis.

yb axis A straight line passing through any point on the reference axis and rotated counterclockwise from the zb axis by 90 degrees according to the definition of the right-hand coordinate system. The straight line is coincident with the Y axis of the absolute coordinate system at the original point of the absolute coordinate system, and subsequently it is not rotated with respect to the zb axis.

xb axis: A straight line passing through any point on the reference axis and vertical to the zb axis and the yb axis.

Next, the local coordinate system is set.

z axis: a normal line of a surface passing through the original point of the local coordinate.

y axis: a straight line passing through the original point of the local coordinate and rotated counterclockwise from the z direction by 90 degrees according to the definition of the right-hand coordinate system.

x axis: a straight line passing through the original point of the local coordinate and vertical to the yb-zb plane.

Accordingly, the tilt angle within the yb-zb plane of the i-th surface is an angle θxbi (unit °) at which the counterclockwise direction of the z axis of the local coordinate system with respect to the zb axis of the on-reference-axis coordinate system is set as positive.

The tilt angle within the xb-zb plane of the i-th surface is represented by an angle θybi (unit °) at which the counterclockwise direction with respect to the zb axis of the on-reference-axis coordinate system is set as positive, and the tilt angle within the xb-yb plane of the i-th surface is represented by an angle θzbi (unit °) at which the counterclockwise direction with respect to the yb axis of the on-reference-axis coordinate system is set as positive.

Figure 2:
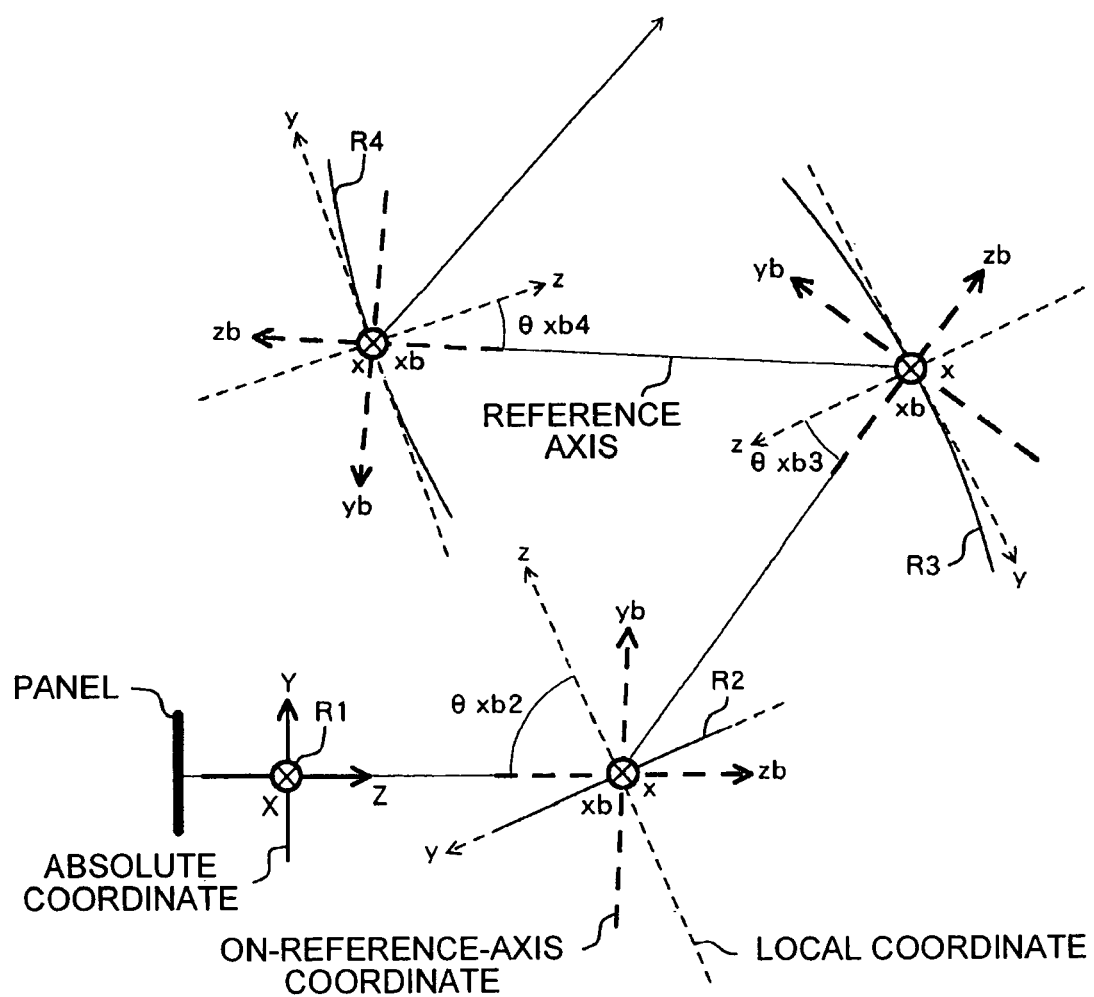
FIG. 2 is a diagram showing the absolute coordinate system, the coordinate system on the reference axis, and the local coordinate system of the embodiments of the present invention.

However, normally, the angle θzbi corresponds to the rotation of the surface, and it does not exist in this embodiment. FIG. 2 shows the mutual relationship of the absolute coordinate system, the on-reference-axis coordinate system and the local coordinate system.

Di represents a scalar amount representing the interval between the original points in the local coordinate of the i-th surface and the (i+1)-th surface, and Ndi, vdi represent the refractivity and Abbe number of the medium between the i-th surface and the (i+1)-th surface, respectively.

Here, the shape of the spherical surface is represented by the following equation.

$$z = \frac{(x^2+y^2)/Ri}{1+\{1-(x^2+y^2)/Ri^2\}^{1/2}}$$

Furthermore, the optical system of this embodiment has one or more rotational asymmetrical aspheric surfaces, and the shape thereof is represented by the following equation.

$$z = C02y^2 + C20x^2 + C03y^3 + C21x^2y + C04y^4 + C22x^2y^2 + C40x^4 + C05y^5 + C23x^2y^3 + C41x^4y + C06y^6 + C24x^2y^4 + C42x^4y^2 + C60x^6$$

The above curved surface equation has only even order terms with respect to x, and thus the curved surface defined by the above curved surface equation has a plane-symmetrical shape with the yz plane as a symmetrical surface. Furthermore, when the following condition is satisfied, it represents a symmetrical shape with respect to the xz plane.

C03=C21=t=0

Furthermore, when the following is satisfied: C02=C20, C04=C40=C22/2, C06=C60=C24/3=C42/3, it represents a rotational symmetrical shape. When the above condition is not satisfied, it represents an asymmetrical shape. Furthermore, e-X represents $10^{-x}$.

Figure 3:
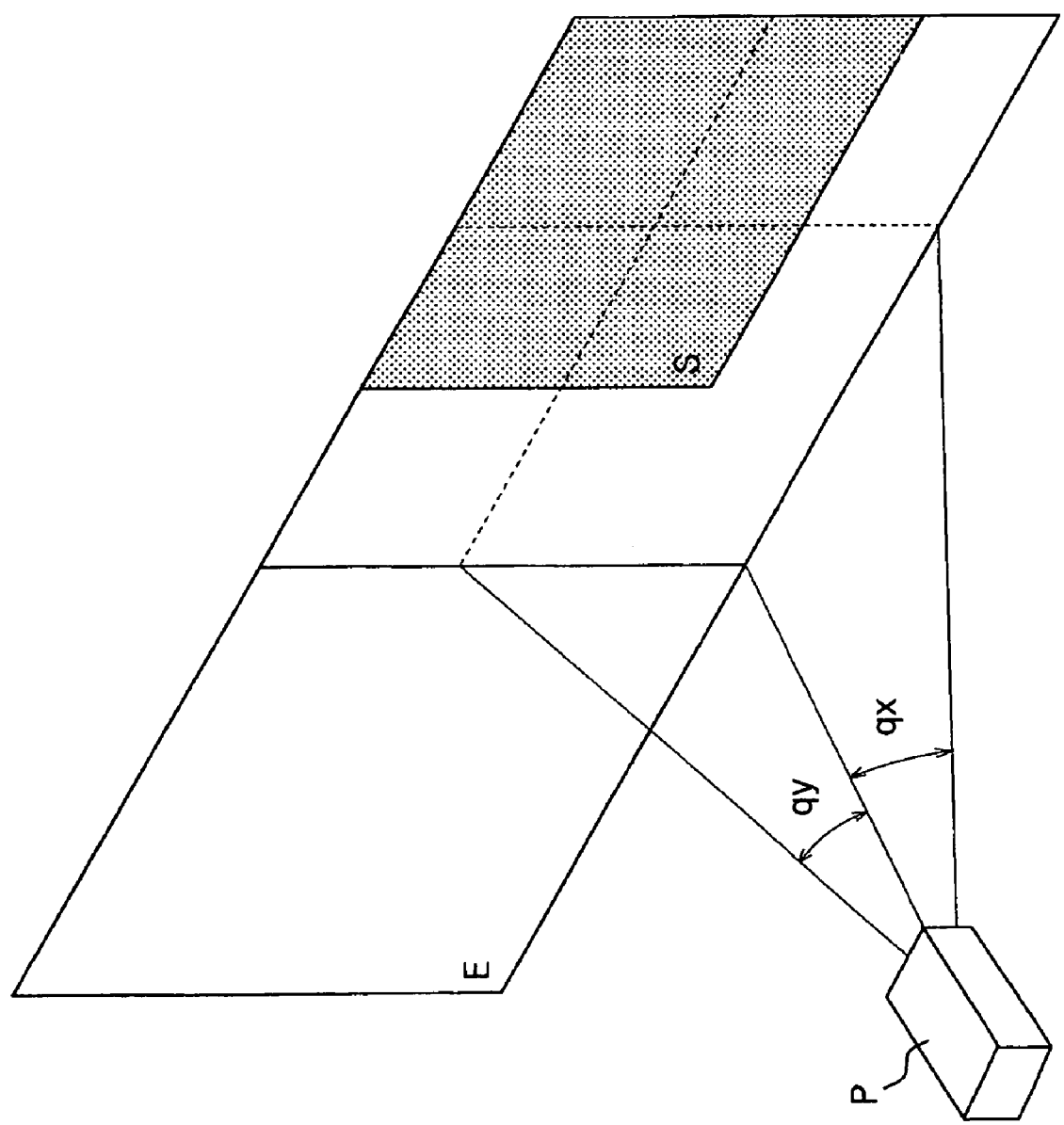
FIG. 3 is a diagram showing the projection angle in the embodiments of the present invention.

Next, the projection angle of the optical system when a two-dimensional image surface formed by the scan type display optical system of this embodiment is moved or tilted on the projection surface will be described. FIG. 3 shows the positional relationship between the projection surface and the two-dimensional image surface in this embodiment.

P denotes a scan type image display apparatus having the scan type display optical system according to this embodiment, and S denotes a two-dimensional image surface on which an image (moving image) is actually displayed. E denotes an area serving as a projection surface such as a screen or the like on which the image surface S is movable while keeping excellent performance of image-formation, and this will be hereinafter referred to as an effective projection surface. Furthermore, the position of the image surface S within the effective projection surface E is represented by the angle formed between each of x and y components of the reference axis extending from the center of the exit pupil of the optical system to the center of the image surface S and the normal line of the projection surface, and these angles are represented by projection angles qx and qy, respectively.

The basic principle for varying the projection angle while keeping excellent optical performance in the scan type display optical system of this embodiment will be described with reference to FIG. 4.

Figure 4:
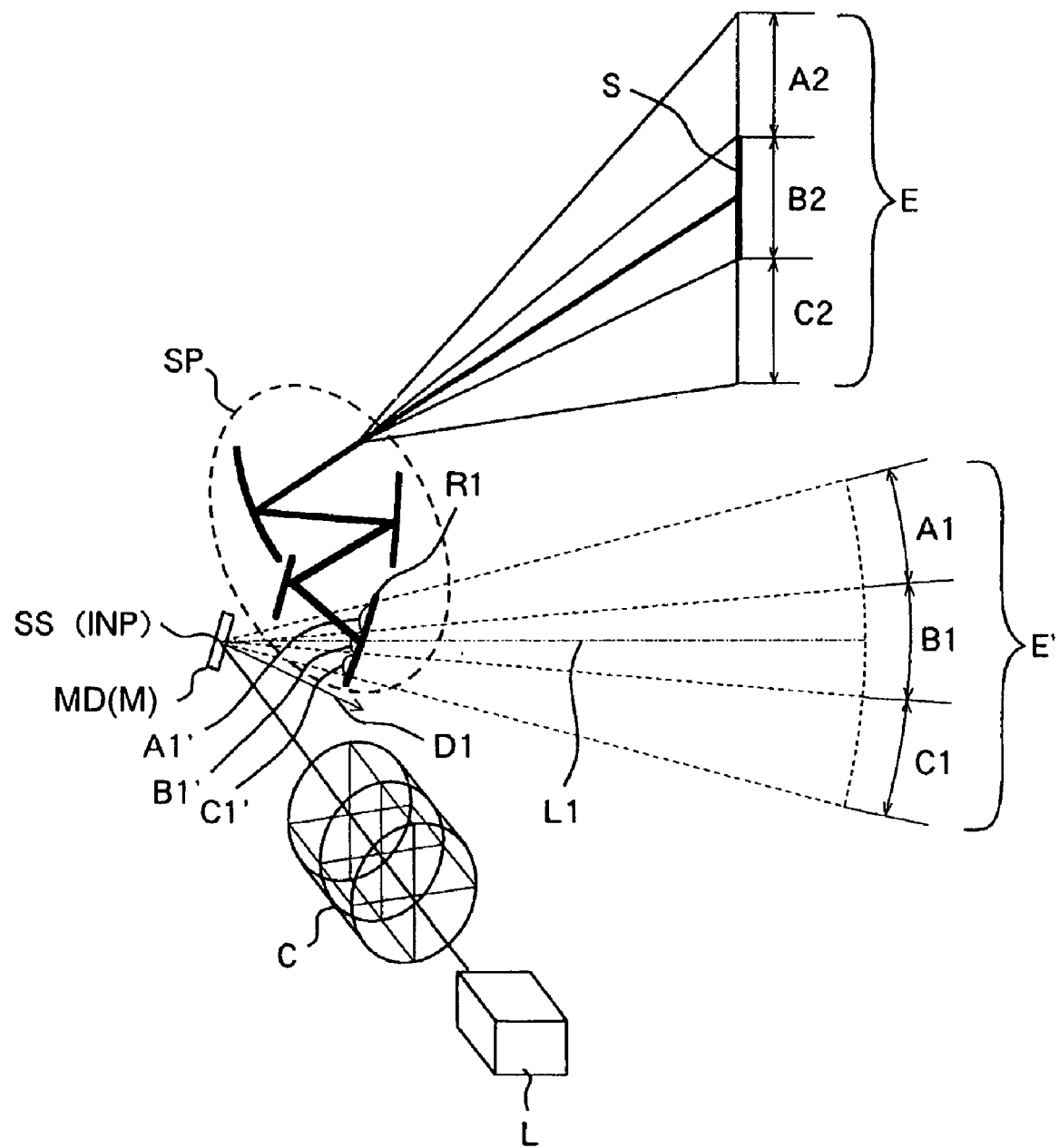
FIG. 4 is a diagram showing the principle of change of the projection angle in the embodiments of the present invention.

In FIG. 4, L denotes a modulated light emitting device such as a light emitting diode, a laser or the like which is used as a light source, and it emits light modulated in conformity with a video signal supplied from a video information supply apparatus (personal computer, television, VCR, DVD player or the like) equipped at the outside. Monochromatic light or light of three colors RGB is emitted from the modulated light emitting device L.

C denotes a collimator lens for collimating the modulated light of the modulated light emitting device L. MD denotes an optical scanning device, and comprises MEMS (Micro-Electro-Mechanical Systems) device. The optical scanning device MD reflects incident light by a resonantly-swinging minute mirror to deflect and scan the incident light in one-dimensional direction or two-dimensional direction. The MEMS device is manufactured by an MEMS technique using a semiconductor manufacturing technique, etc., for example, and it has an advantage that it can be designed to be compact in size and light in weight.

The modulated light emitted from the modulated light emitting device L is collimated by the collimator lens C, and deflected by the optical scanning device MD to be scanned in an area B1 within a surface E' to be scanned on which the modulated light is scanned when it is assumed that there is no projection optical system SP based on the optical scanning device MD as described later.

Here, it is sufficient for the lens C to merely have a scanning capability under a uniform aberration state in the area B1, and thus the image-forming surface may be formed in the area B1. That is, the lens C is not limited to the collimator lens, and it may have imaging capability.

At this time, even when the light-scanned area B1 is actually moved to A1 or C1, the optical performance is unchanged in these areas. That is, the area in which the light is actually scanned is continuously moved while keeping the optical performance on the scanned surface E'. A method of moving the light-scanned area will be described later.

The optical scanning device MD scans light with reference to a certain direction, and thus the direction of the bisector of the intersection angle between the reference axis ray incident to the scanning surface (mirror surface) with respect to the straight line L1 connecting the center of the scanning surface of the optical scanning device MD and the center of the light-scanned range is called a reference surface normal direction D1 of the optical scanning device MD.

As described above, when the lens C has performance of image-formation, it is desirable that the image-forming surface of the area B1 (scanned surface E') on which the modulated light is scanned is formed on a spherical surface having the center of the scanning surface in the optical scanning device MD as the center of curvature. Accordingly, when the area B1 is moved to A1 or C1, it can be continuously moved on the scanned surface E' while keeping the optical performance.

Next, as shown in FIG. 4, the projection optical system SP containing reflective surfaces having curvature as constituent elements is disposed so that the minute mirror M of the optical scanning device MD is located at the entrance pupil position SS (INP) of the projection optical system SP, whereby the modulated light to be scanned on the scanned surface E' is guided to the projection optical system SP. At this time, the projection optical system SP is designed so that the modulated light in the overall scanned range of the optical scanning device MD can be formed an image on the projection surface E with excellent optical performance.

Furthermore, by using the projection optical system SP containing the reflective surfaces having curvature as the constituent elements, the modulated light can be projected obliquely with respect to the effective projection surface E by the characteristic of the Off-Axial optical system. At this time, the modulated light scanned in the areas A1, B1 and C1 when it is assumed that there is no projection optical system SP is guided to the projection optical system SP, however, in actuality, the modulated light is scanned on a first surface R1 corresponding to a surface on which the modulated light is incident initially, of the projection optical system SP.

In this embodiment, areas on the first surface R1 of the projection optical system SP to which the modulated light to be respectively scanned in the areas A1, B1, C1 on the scanned surface E' is guided will be referred to as light guide areas A1', B1', C1', respectively.

Accordingly, the modulated light emitted from the modulated light emitting device L is projected via the optical scanning device MD and the projection optical system SP to the area B2 on the effective projection surface E. As described above, by rotating the reference surface normal direction D1 of the optical scanning device MD, the modulated light scanned in the light guide areas A1', B1', C1' on the first surface R1 of the projection optical system SP is formed an image onto the areas A2, B2, C2 on the effective projection surface E, respectively. As a result, according to this embodiment, the modulated light can be projected at any projection angle within the projection surface E on which it is guaranteed that the projection optical system SP has excellent optical performance to display an image.

Furthermore, if aberration in each of the light guide areas A1', B1', C1' on the first surface R1 occurs uniformly, it is not necessarily required to form an image as described above. In this case, a case where the modulated light is not collimated light, that is, the performance of image-formation is equipped even when the projection optical system SP is removed will be described.

It is not necessarily required to form an image on the spherical plane in the area B1 of the scanned range E' That is, the image surface in the area B1 is not required to form a spherical surface. In other words, as is apparent from the description of the principle described above, in order to make the projection angle variable, an image formed in the area B1 is required to continuously move on the scanned surface E' while keeping uniform optical performance, and in order to ideally implement this, the scanned surface E' is set to a spherical surface.

However, in actuality, the permissible amount of the optical performance such as focal depth, distortion, etc., has a width. Therefore, the scanned surface E' may be designed in any surface shape insofar as the optical performance is within the above permissible amount, and it is not necessarily required to be a spherical surface.

Furthermore, when the projection optical system SP of this embodiment makes the image surface S variable two-dimensionally on the effective projection surface E, it is not required to be sufficiently corrected if occurrence of aberration is uniform over the whole field angle in each azimuth direction. This is because if occurrence of the aberration over the whole field angle is uniform, the correction can be performed by the projection optical system SP.

Furthermore, when the position of the image surface S can be moved one-dimensionally only in one direction on the effective projection surface E, the performance of image-formation in the non-movement direction is not required to be excellent if occurrence of aberration of the whole field angle is uniformed in only the moving direction. This is also because the correction can be performed by the projection optical system SP.

With respect to the zoom function for displaying the image surface S on the effective projection surface E at any magnification, according to this embodiment, the modulated light scanned on the first surface R1 of the projection optical system described above is enlarged and projected on the effective projection surface E by the projection optical system SP. Therefore, the zoom function can be realized by enlarging/reducing the size of the light guide area on the first surface R1 of the projection optical system SP. Furthermore, variation of the size of the light guide area on the first surface of the projection optical system SP can be electrically performed by the optical scanning device MD, so that the zooming function can be more easily performed in comparison with a normal zoom mechanism for shifting an optical unit.

Embodiment 1

Figure 6:
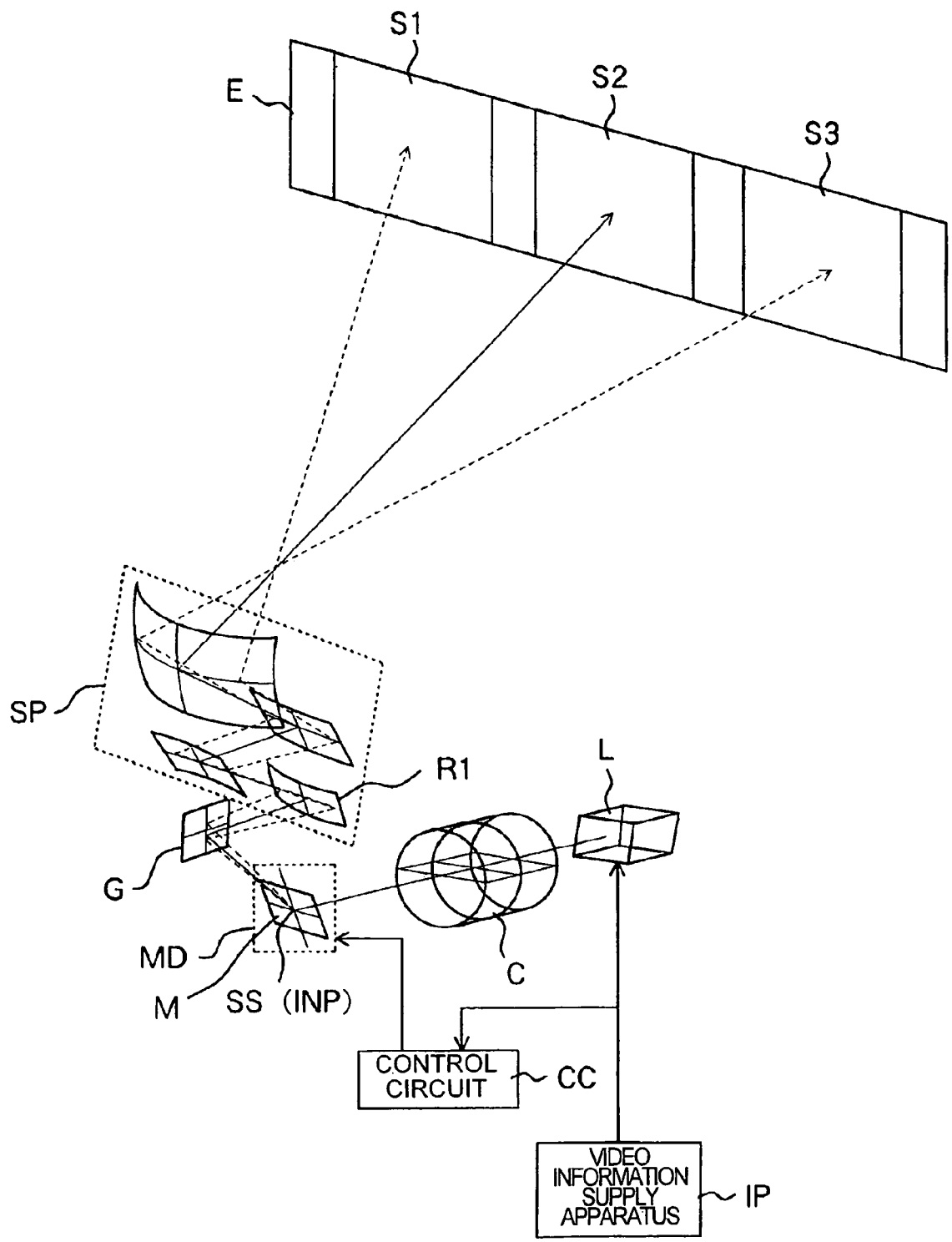
FIG. 6 is a diagram showing the construction of a scan type image display apparatus using a scan type display optical system of Embodiment 1 of the present invention.

FIG. 6 shows the structure of a scan type display optical system mounted in a scan type image display apparatus according to Embodiment 1 of the present invention. In this embodiment, a video image display position on the effective projection surface E is varied by mechanically varying the reference surface normal direction (D1 represented in FIG. 4) of an optical scanning device MD (minute mirror M).

Figure 7A:
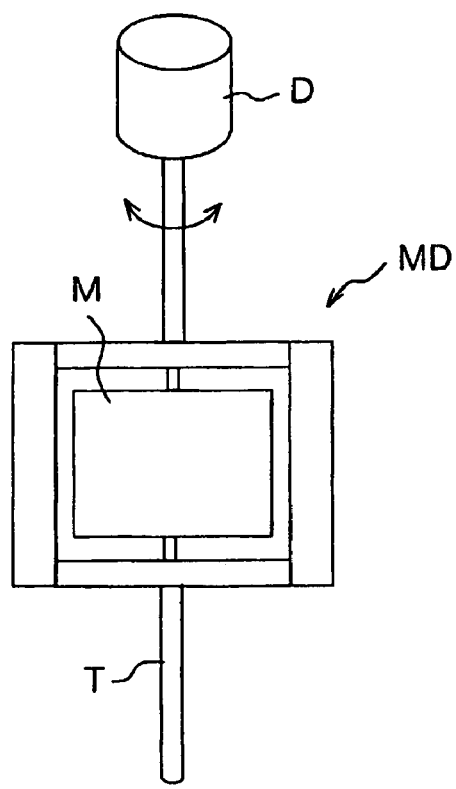
FIG. 7A is a diagram showing a rotating method in a reference surface normal direction of a minute mirror of Embodiment 1.
Figure 7B:
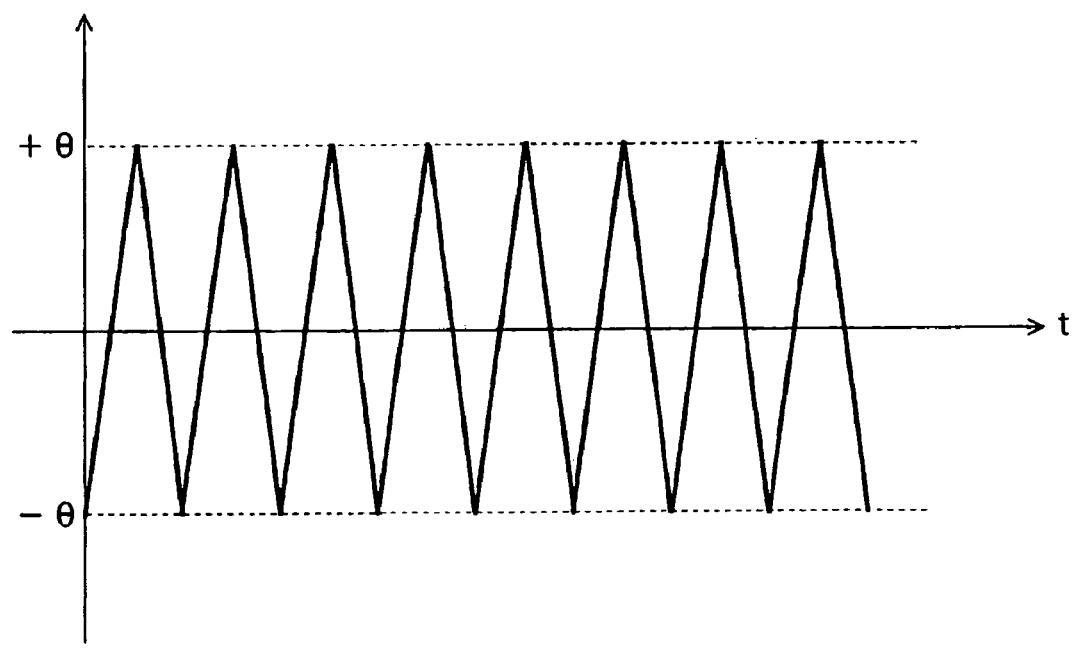
FIG. 7B is a diagram showing a swing waveform of the minute mirror.

Here, FIG. 7A shows the enlarged optical scanning device MD. The optical scanning device MD deflects and scans incident modulated light by vibrating (swinging) the minute mirror M as a first mirror at high speed. FIG. 7B shows variation of the time t and the rotational angle of the minute mirror M. The minute mirror M is reciprocally swung between angles +θ and −θ.

T denotes a rotating member for varying the reference surface normal direction of the mirror M, and a driving motor D is connected to this rotating member T. When the driving motor D is rotated, the whole of the optical scanning device MD is rotated together with the rotating member T, and the reference surface normal direction of the minute mirror M is varied. The rotating member T and the driving motor D constitute an incident range changing member.

The operation of the driving motor D and the operation of the optical scanning device MD are controlled by a control circuit CC. The control circuit CC controls to swing the minute control mirror M in synchronization with the horizontal/vertical synchronous signal or the like of video signals input from the video information supply apparatus IP (the same is satisfied in the following embodiments).

In this embodiment, the modulated light is scanned in a predetermined one-dimensional direction (first direction: horizontal direction on the effective projection surface E) by the minute mirror M of the optical scanning device MD, and further scanned in a second direction (vertical direction on the effective projection surface E) orthogonal to the first direction by swinging the galvanomirror G as a second mirror, thereby scanning the modulated light in the two-dimensional direction.

Furthermore, the movement of the area in which the modulated light is scanned is carried out by varying the reference surface normal direction of the minute mirror M of the optical scanning device MD through the rotating member T by the driving motor D as described above. Therefore, according to this embodiment, two-dimensional video images S1 to S3 (image surface S) are projected at any position on the effective projection surface E as shown in FIG. 6.

Here, in the scanning in the second direction, the normal galvanomirror has a swing motion represented by sine wave. In this case, there occurs a difference in scanning speed between the center portion and the peripheral portion of the swing motion. Therefore, in the projection optical system SP of this embodiment, the scanning speed difference described above is corrected with respect to the second direction, whereby an excellent video image is projected onto the effective projection surface E.

Figure 8:
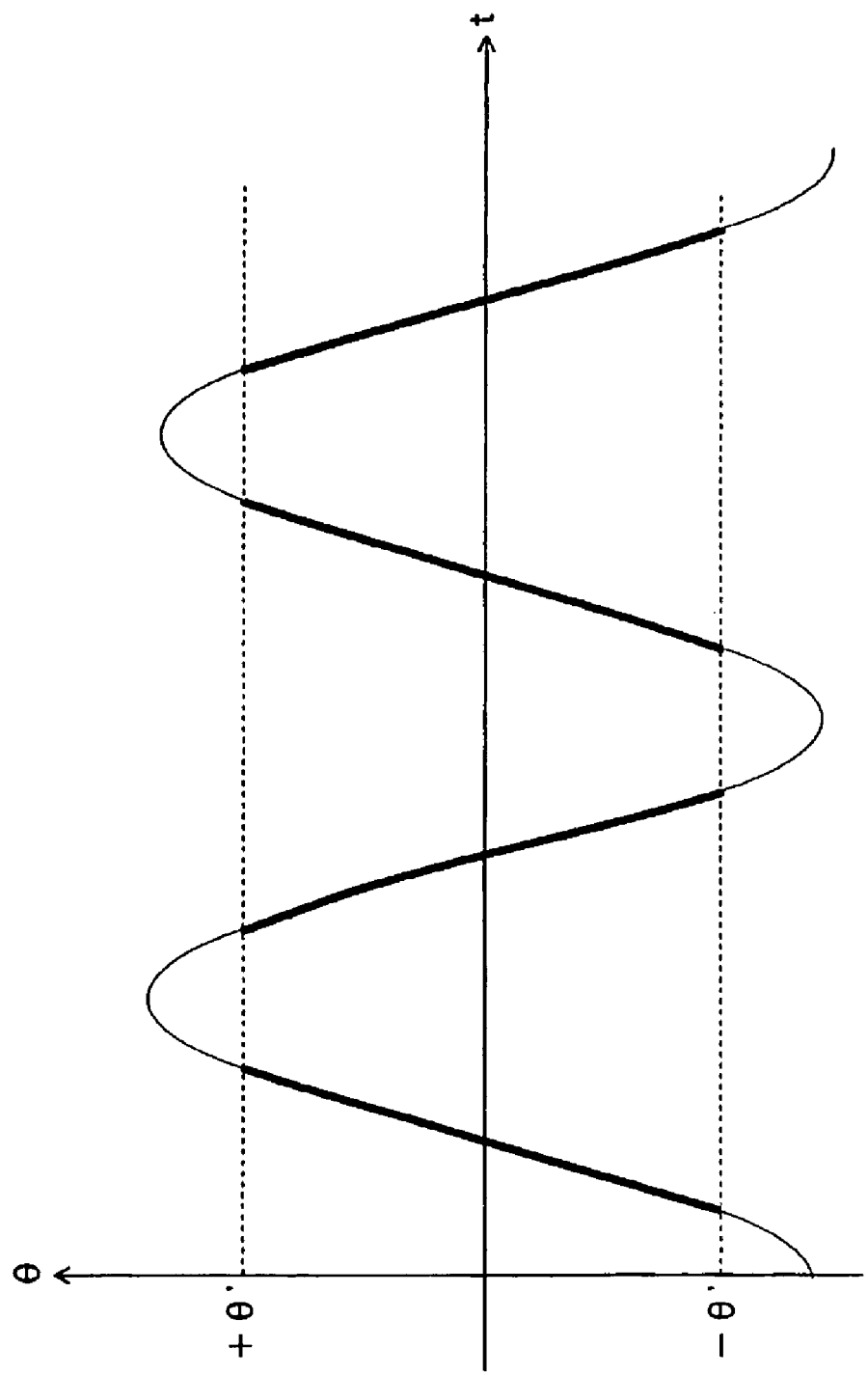
FIG. 8 is a diagram showing an optical using range of a galvanomirror rotating with a sine wave in Embodiment 1.

FIG. 8 shows variation of the rotational angle of the galvanomirror G with respect to the time t. It is difficult to correct the overall area of the rotation of the galvanomirror by the shape of the optical surface constituting the projection optical system SP. Therefore, according to this embodiment, the shape of the optical surface of the projection optical system is set so that the correction can be performed on only the rotational area (+θ' to −θ') represented by a heavy line in FIG. 8.

However, when this correction is carried out, the correction in the projection optical system SP becomes ineffective if the light guide area to the projection optical system SP is moved in the second direction. Therefore, in this embodiment, the light guide area for guiding the modulated light to the projection optical system SP is made movable only in the first direction, whereby the image surface S is made movable only in the first direction on the effective projection surface E.

When the rotational area of the galvanometer G represented by a heavy line in FIG. 8 is regarded as a line, the image surface S in the second direction can be moved.

Furthermore, in this embodiment, video images can be displayed in a plurality of areas on the effective projection surface E by switching the rotational position (the reference surface normal direction of the optical scanning device MD) of the rotating member T in synchronization with the input timing of a video signal from the video information supply apparatus IP to the modulated light emitting device L by the control circuit CC. "Synchronization" described here will be described with reference to FIG. 9.

Figure 9:
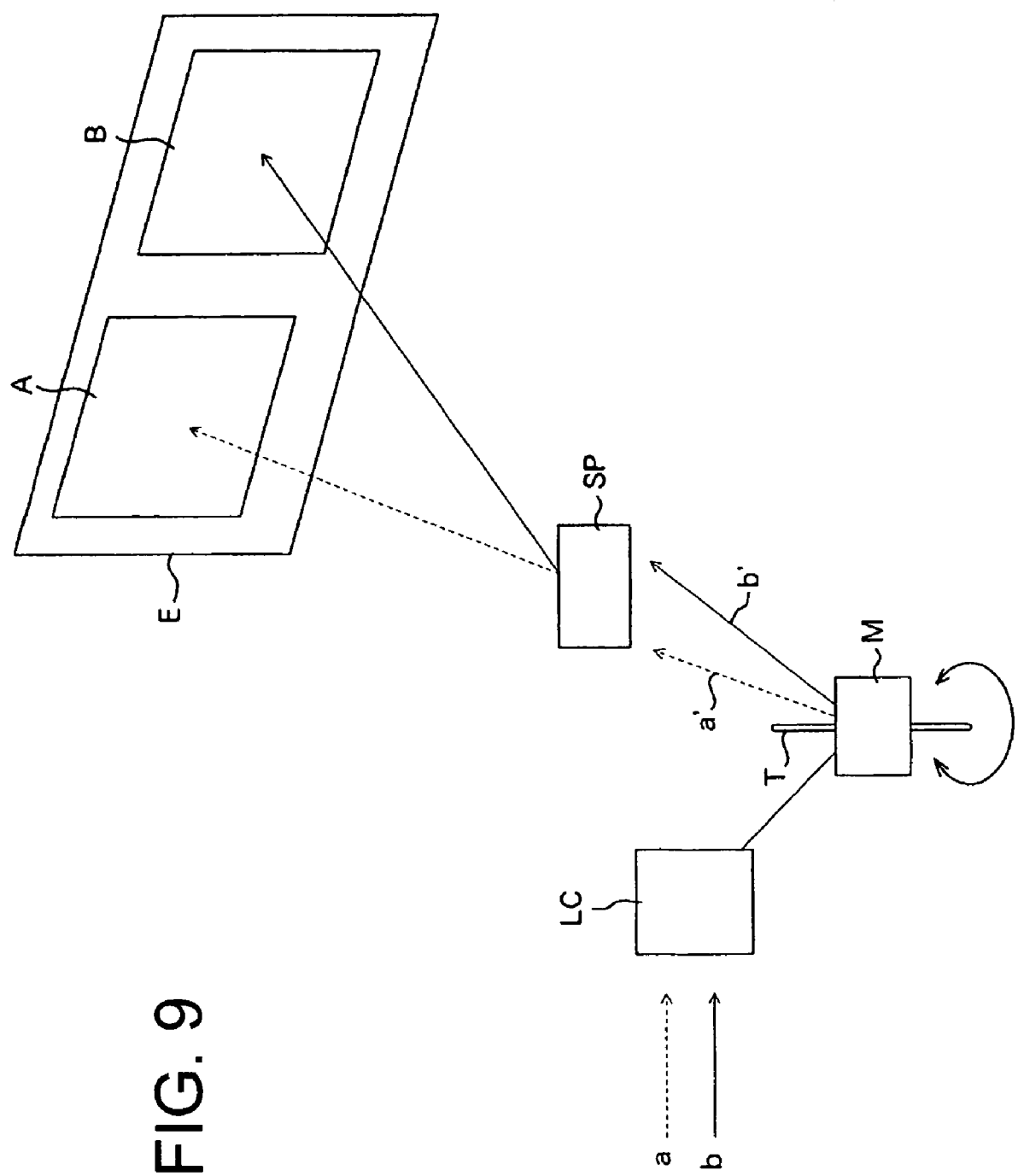
FIG. 9 is a diagram showing the synchronization between a video signal and rotation of a rotating member in Embodiment 1.

FIG. 9 shows the principle for displaying the video images in the plurality of areas on the effective projection surface E by varying the video signal input to the modulated light emitting device L at the timing matched with the variation in the reference surface normal direction. LC denotes a light source optical system containing the modulated light emitting device L and the collimator lens C.

The modulated light which is guided to the projection optical system SP by the scanning of the minute mirror M of the optical scanning device MD is displayed as a video image at some position on the effective projection surface E. At this time, the video image display position (the position of the image surface S) can be moved to A and B by varying the reference surface normal direction of the minute mirror M of the optical scanning device MD to a', b' through rotation of the rotating member T. Furthermore, when the reference surface normal direction is a', a video signal a is input from the video information supply apparatus IP to the modulated light emitting device L, and when the reference surface normal direction is b', a video signal b is input from the video information supply apparatus IP to the modulated light emitting device L. By performing this switching operation at high speed, a plurality of moving images (video image) A, B can be displayed at different positions on the effective projection surface E.

Figure 10A:
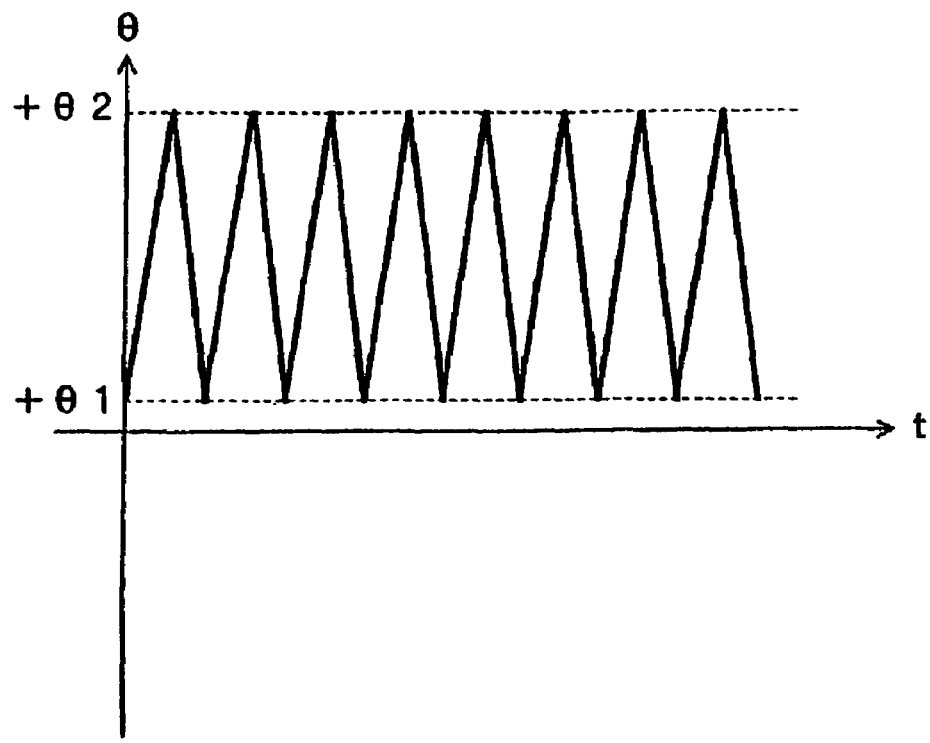
FIG. 10A and FIG. 10B are diagrams showing the swing waveforms of the minute mirror in different reference surface normal directions in Embodiment 1.
Figure 10B:
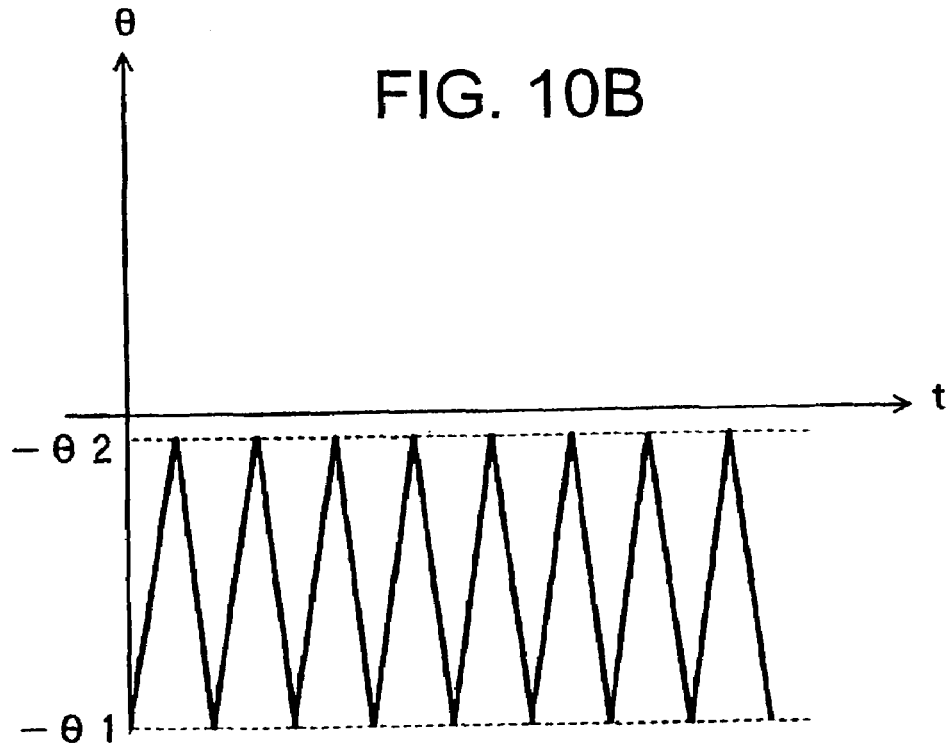

FIG. 10A and FIG. 10B show the swinging state of the minute mirror M whose reference surface normal direction is varied by rotating the rotating member T. When the minute mirror is swung between +θ1 and +θ2 as shown in FIG. 10A, the video signal a is input to the modulated light emitting device L, and when the minute mirror M is swung between −θ2 to −θ1 as shown in FIG. 10B, the video signal b is input to the modulated light emitting device L, whereby a plurality of moving images (video images) having different information can be displayed simultaneously.

Next, the details of the scan type display optical system of this embodiment will be described with reference to FIG. 11 and FIG. 12.

Figure 11:
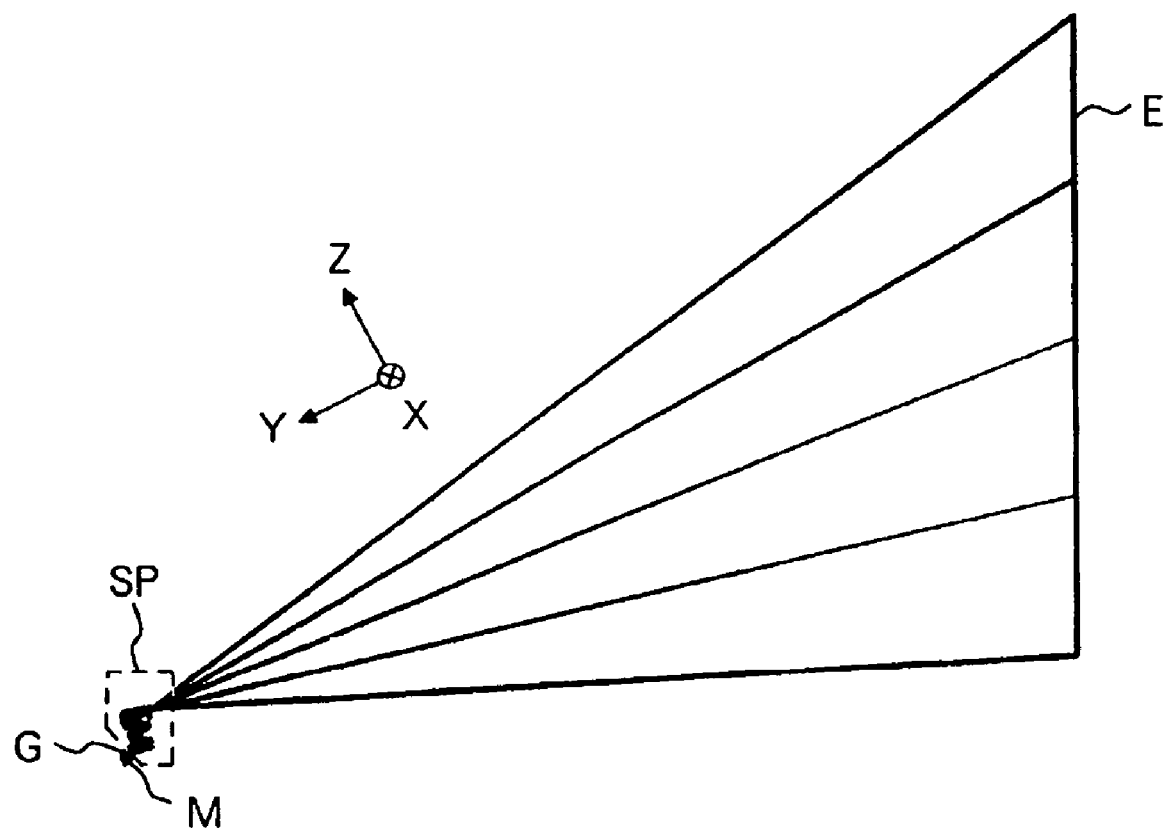
FIG. 11 is a diagram showing the aspect of projection to an effective projection surface by the scan type display optical system of Embodiment 1.
Figure 12:
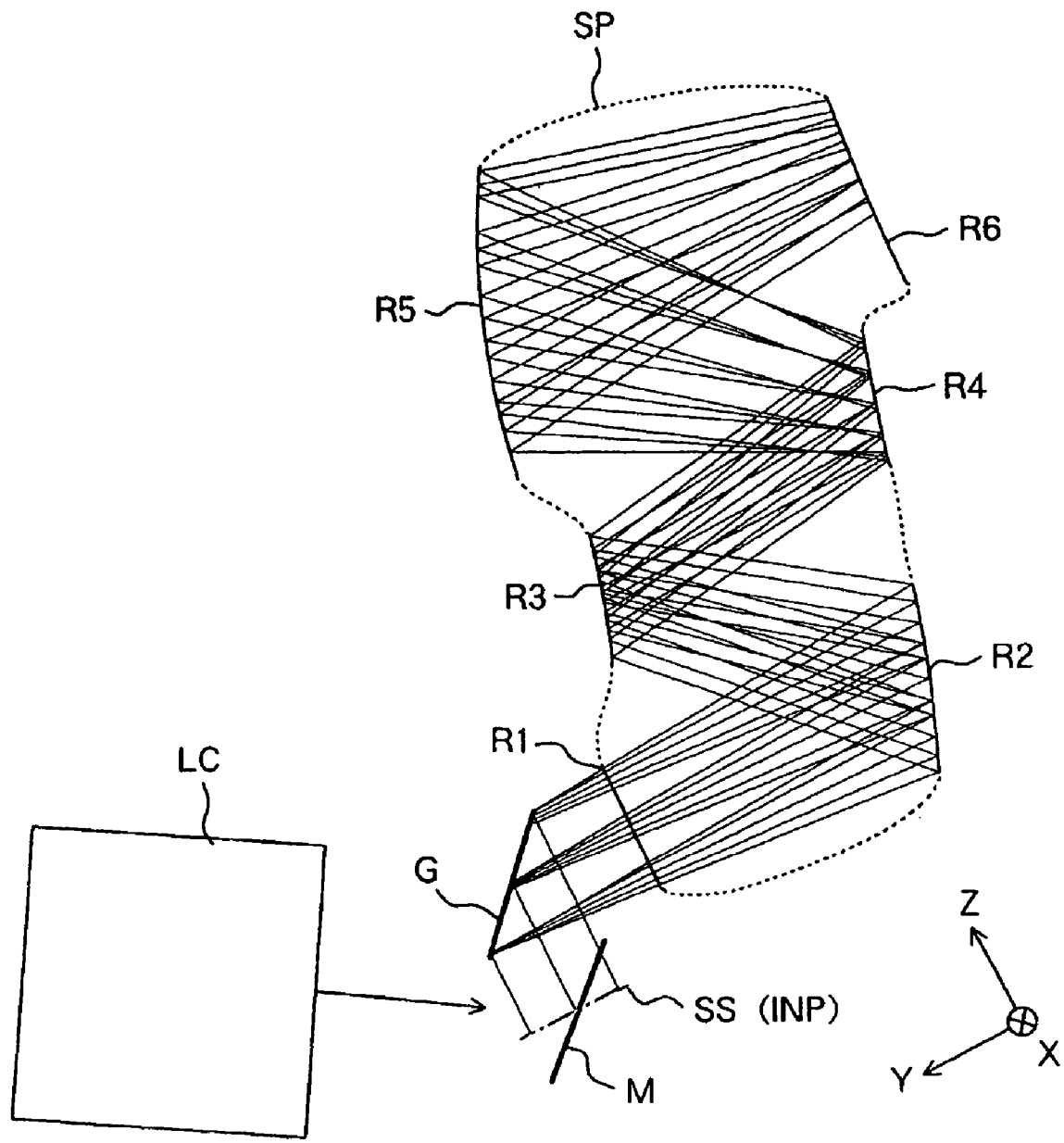
FIG. 12 is a diagram showing the construction of the scan type display optical system according to Embodiment 1.

FIG. 11 shows the aspect of projection of modulated light to the effective projection surface E by the scan type display optical system of this embodiment, and FIG. 12 shows the light source optical system LC containing the modulated light emitting device L and the collimator lens C, the minute mirror M of the optical scanning device MD, the galvanomirror G and the projection optical system SP while enlarging these elements. The collimated modulated light from the light source optical system LC (collimator lens C) is incident to the minute mirror M.

In this embodiment, the minute mirror M is disposed at the entrance pupil (aperture stop) position SS (INP) of the projection optical system SP. With respect to the swing angle of the galvanomirror G, the maximum angle θx,gmax=45°±3.30°. As described above, there is a difference in scanning speed between the swing center portion and peripheral portion of the galvanomirror G swinging in the sine wave. Therefore, in this embodiment, the scanning speed difference is corrected in the projection optical system SP by using a part of the whole swinging angle. The swing angle θx,g which is actually used for the scanning of light in the galvanomirror G is equal to 45°±2.64°.

Furthermore, R1 to R6 denote six optical surfaces constituting the projection optical system SP. These optical surfaces R1 to R6 are formed on an integral optical element having a prism shape in which optical glass is filled. R1 and R6 denote refractive surfaces to/from which light rays enter and emerge, and are formed of rotational asymmetrical aspheric surfaces. R2 to R5 denote reflective surfaces, and are formed of rotational asymmetrical aspheric surfaces.

The projection optical system SP as the Off-Axial optical system containing the reflective surfaces as the rotational asymmetric aspheric surfaces is a projection optical system using an Off-Axial system in which light modulated in the modulated light emitting device L, passing through the collimator lens C and deflected and scanned by the minute mirror M and the galvanomirror G is guided to the effective projection surface E shown in FIG. 11 to form a two-dimensional video image on the effective projection surface E.

In FIG. 11, light rays are shown over the whole area of the effective projection surface E. This represents that the projection optical system SP guarantees the optical performance over the whole area. In actuality, a video image is displayed in a partial area on the effective projection surface E in conformity with the area for guiding light to (the first surface R1 of) the projection optical system SP by the minute mirror M and the galvanomirror G.

Furthermore, in this embodiment, the size of the effective projection surface E is equal to 304.8×812.8 mm. Furthermore, the size of the image surface S is set to any value in the effective projection surface E in conformity with the area for guiding light to the projection optical system SP. Therefore in this case, an example is shown, and the projection angle thereof is shown. When the image surface S has a size of 20 inches (304.8×406.4 mm) of 3:4 in aspect ratio, the corrected projection angle range (that is, the range in which the image surface S can be tilted) represented by the angle formed between the normal line of the effective projection surface E and the reference axis described above is as follows.

qx: −22.12° to +22.12°
qy: +23.43°

The swing angle of the minute mirror M in the first direction is equal to ±6.12°. The swing angle of the galvanomirror G in the second direction is equal to ±3.30°, and the swing angle actually used for light scanning is equal to ±2.64° as described above.

When the scanning is carried out on the whole area of the effective projection surface E, the swing angle of the minute mirror M in the first direction is equal to ±12.24°, and the swing angle of the galvanomirror G in the second direction is equal to ±3.30° (the swing angle used for scanning is equal to ±2.64°).

The data showing the structure of the scan type display optical system according to this embodiment is shown below.

Entrance pupil diameter 3 mm
Variable projection angle range
qx: −22.12°∼+22.12°, qy: +23.43°

| Surface i | Yi | Zi | Di | θx, i | Ndi | νdi | |
|---|---|---|---|---|---|---|---|
| 1 | 0.00 | 0.00 | 4.00 | 0.00 | 1 | | Aperture stop/Minute mirror |
| 2 | 0.00 | 4.06 | 4.00 | 45.00 | 1 | | Galvanomirror |
| 3 (R1) | −4.00 | 4.00 | 10.00 | 0.00 | 1.56093 | 62.55 | Transmissive surface |
| 4 (R2) | −14.00 | 4.00 | 10.00 | −20.00 | 1.56093 | 62.55 | Transmissive surface |
| 5 (R3) | −6.34 | 10.43 | 10.00 | 23.86 | 1.56093 | 62.55 | Transmissive surface |
| 6 (R4) | −16.25 | 11.77 | 12.00 | −23.00 | 1.56093 | 62.55 | Transmissive surface |
| 7 (R5) | −6.83 | 19.21 | 12.00 | 17.35 | 1.56093 | 62.55 | Transmissive surface |
| 8 (R6) | −18.81 | 18.46 | 500.00 | 0.00 | 1 | | Transmissive surface |
| 9 | −517.83 | −12.72 | −23.43 | | 1 | | Image surface |

Aspheric surface shape

| Surface | | | |
|---|---|---|---|
| R1 | C02 = 4.70688e−003 | C20 = −5.25100e−003 | |
| | C03 = −1.63906e−004 | C21 = 1.62250e−003 | |
| | C04 = 3.96081e−004 | C22 = −5.70982e−005 | C40 = 1.42995e−006 |
| | C05 = 4.42970e−005 | C23 = 1.02422e−004 | C41 = 3.07744e−005 |
| | C06 = −1.42589e−006 | C24 = 4.27558e−005 | C42 = 1.75898e−005 |
| | C60 = 1.64133e−006 | | |
| R2 | C02 = 1.41088e−002 | C20 = 1.72867e−002 | |
| | C03 = −3.12679e−004 | C21 = 8.17068e−005 | |
| | C04 = 7.18131e−005 | C22 = −1.33884e−005 | C40 = −7.06959e−006 |
| | C05 = 4.27876e−006 | C23 = 6.42627e−006 | C41 = 3.82177e−006 |
| | C06 = −3.04089e−007 | C24 = 2.17242e−006 | C42 = 1.05562e−006 |
| | C60 = 1.11861e−007 | | |
| R3 | C02 = 9.51837e−003 | C20 = 3.48084e−002 | |
| | C03 = −2.12898e−003 | C21 = −1.50152e−003 | |
| | C04 = 6.56344e−004 | C22 = −4.00998e−004 | C40 = −3.33150e−004 |
| | C05 = −9.44327e−005 | C23 = 8.03325e−005 | C41 = 6.42858e−005 |
| | C06 = 1.84780e−005 | C24 = 1.54276e−005 | C42 = 1.77914e−005 |
| | C60 = 2.70518e−006 | | |

-continued

Entrance pupil diameter 3 mm
Variable projection angle range
qx: −22.12°∼+22.12°, qy: +23.43°

| | | | |
|---|---|---|---|
| R4 | C02 = −1.55047e−002 | C20 = −1.79597e−002 | |
| | C03 = 8.84215e−004 | C21 = −2.78740e−003 | |
| | C04 = −7.45243e−004 | C22 = −5.37876e−004 | C40 = −1.64028e−004 |
| | C05 = −3.68607e−004 | C23 = −1.75140e−004 | C41 = −3.01304e−005 |
| | C06 = 8.82358e−005 | C24 = −4.61749e−005 | C42 = −6.65597e−006 |
| | C60 = 2.46470e−006 | | |
| R5 | C02 = −2.29132e−002 | C20 = −2.59682e−002 | |
| | C03 = 6.38591e−005 | C21 = 1.03319e−004 | |
| | C04 = −4.85418e−005 | C22 = −1.94137e−005 | C40 = −1.13710e−005 |
| | C05 = 8.40921e−007 | C23 = 4.61244e−007 | C41 = −6.66116e−007 |
| | C06 = −2.61050e−007 | C24 = −2.11583e−007 | C42 = −8.29075e−008 |
| | C60 = −2.74614e−008 | | |
| R6 | C02 = −1.87477e−005 | C20 = −1.39032e−002 | |
| | C03 = −5.88941e−004 | C21 = −4.53244e−004 | |
| | C04 = 3.44834e−004 | C22 = −1.90007e−004 | C40 = −9.21760e−005 |
| | C05 = −1.41998e−004 | C23 = 5.54286e−005 | C41 = 1.93196e−006 |
| | C06 = 9.50410e−006 | C24 = 1.17340e−006 | C42 = −1.07304e−006 |
| | C60 = 6.99852e−007 | | |

Figure 5:
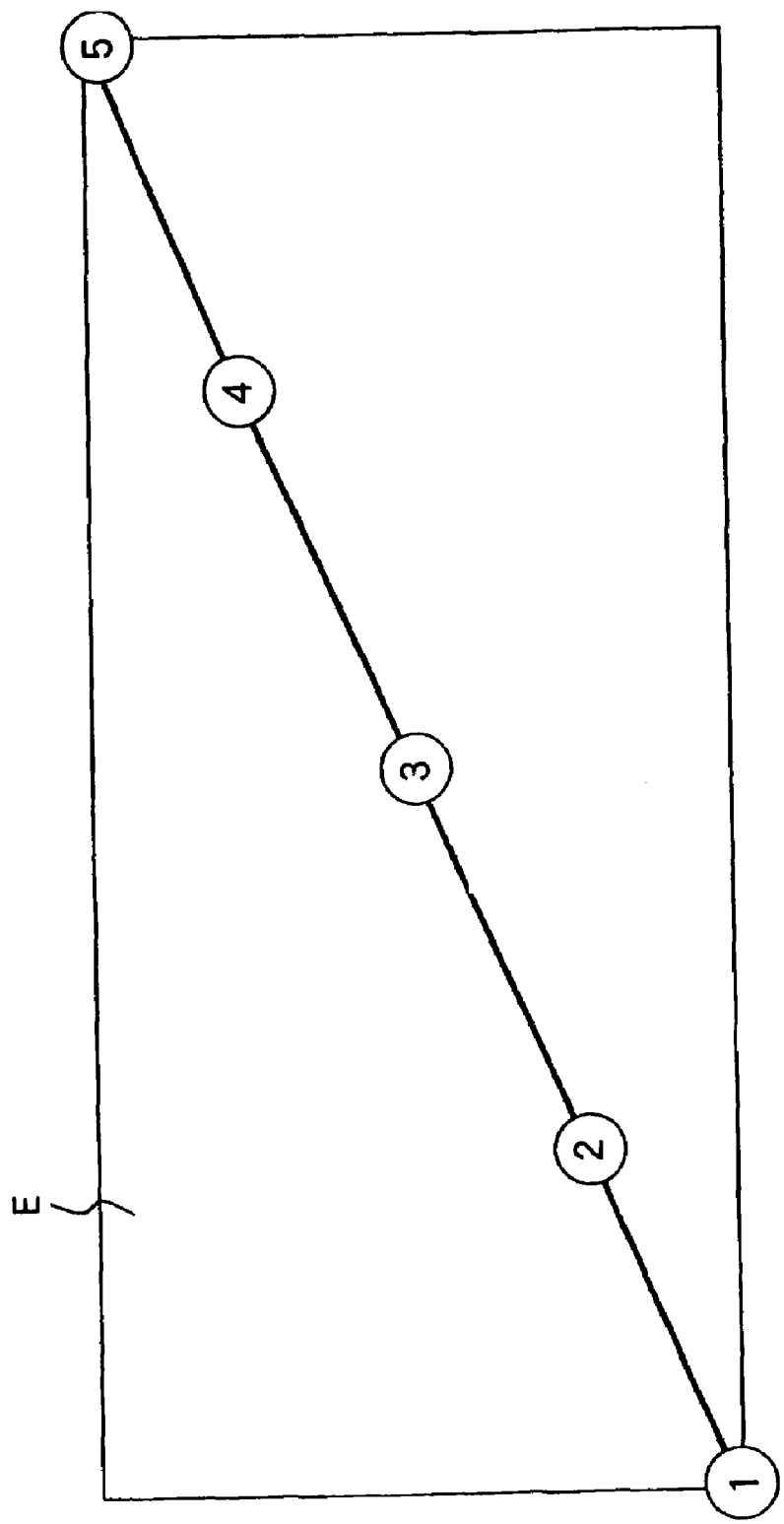
FIG. 5 is a diagram showing the evaluation position of performance of image-formation of the Embodiments of the present invention.

Next, the optical action of this embodiment will be described. The scan type display optical system of this embodiment can move and tilt a two-dimensional image surface on the effective projection surface E. FIG. 5 shows evaluation positions for evaluating lateral aberration on the effective projection surface E (image surface S) by allocating encircled numerical values 1 to 5. It is the performance required of the projection optical system SP that desired performance can be ensured on the projection effective area E for a light ray when the minute mirror M is swung at an angle of ±12.24° and the galvanomirror G is swung at an angle of ±3.30°.

Figure 13:
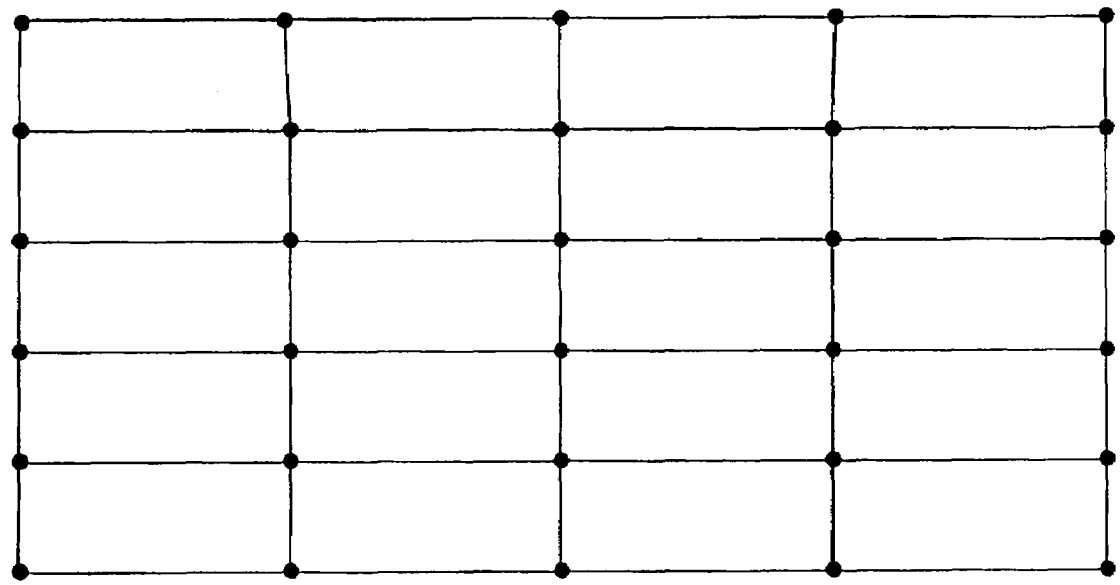
FIG. 13 is a diagram showing distortion in the scan type display optical system of Embodiment 1.
Figure 14:
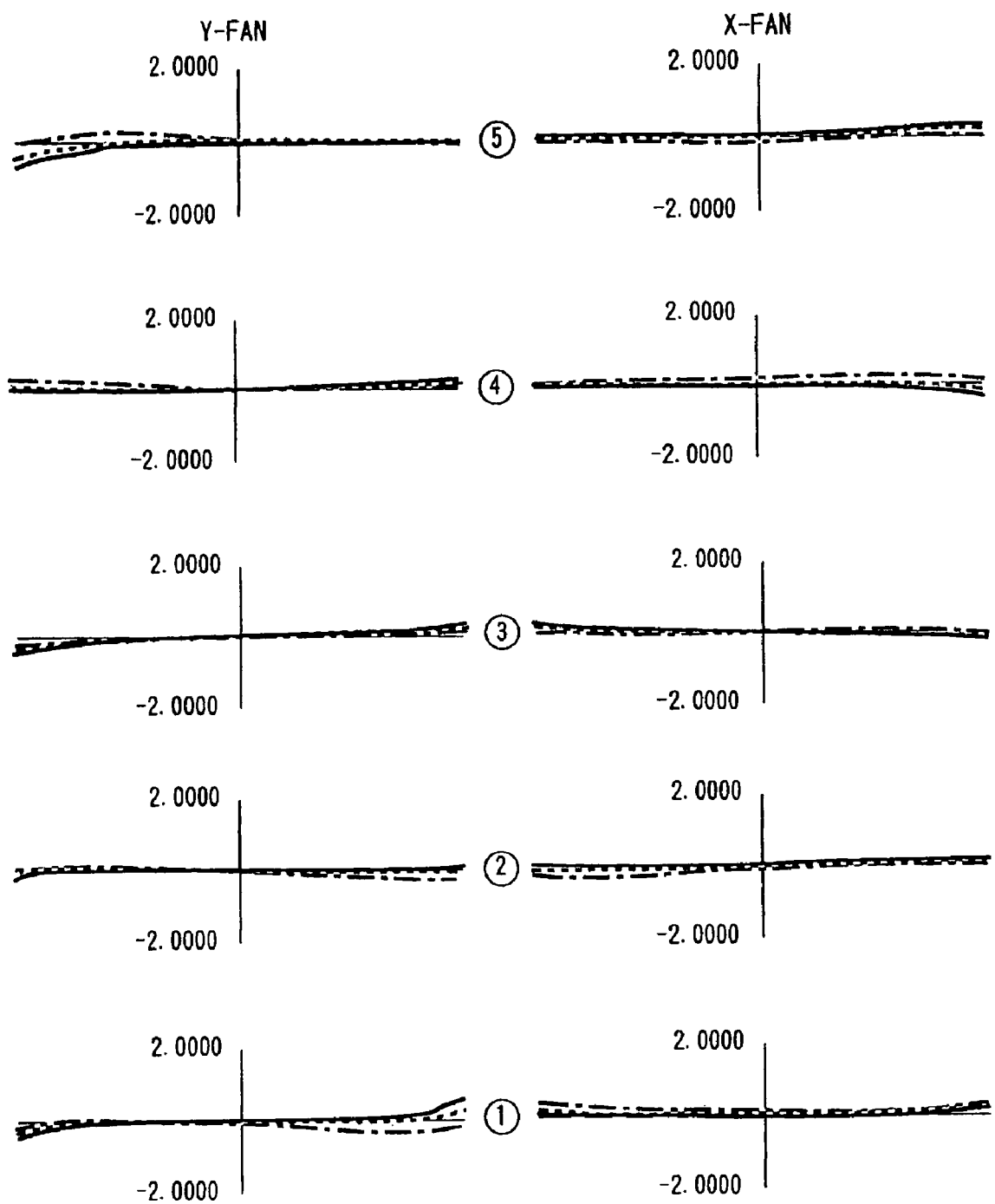
FIG. 14 is a diagram showing the lateral aberration in the scan type display optical system of Embodiment 1.

FIG. 13 shows the aspect of distortion on the effective projection surface E in this embodiment, and FIG. 14 shows lateral aberration graphs at the evaluation positions of 1 to 5 of FIG. 5. In the lateral aberration graphs of FIG. 14, the abscissa axis is the x axis or the y axis on the pupil surface, and the ordinate axis means the aberration amount on the effective projection surface E. Furthermore, in FIG. 14, a solid line represents the lateral aberration of red color light, a broken line represents the lateral aberration of green color light, and a chain line represents the lateral aberration of blue color light.

As is apparent from FIG. 13, no large distortion occurs in the projection image (video image) and little asymmetric distortion occurs. Furthermore, as is apparent from FIG. 14, the modulated light projected to the effective projection surface E is excellently formed an image with little aberration.

Embodiment 2

Figure 15:
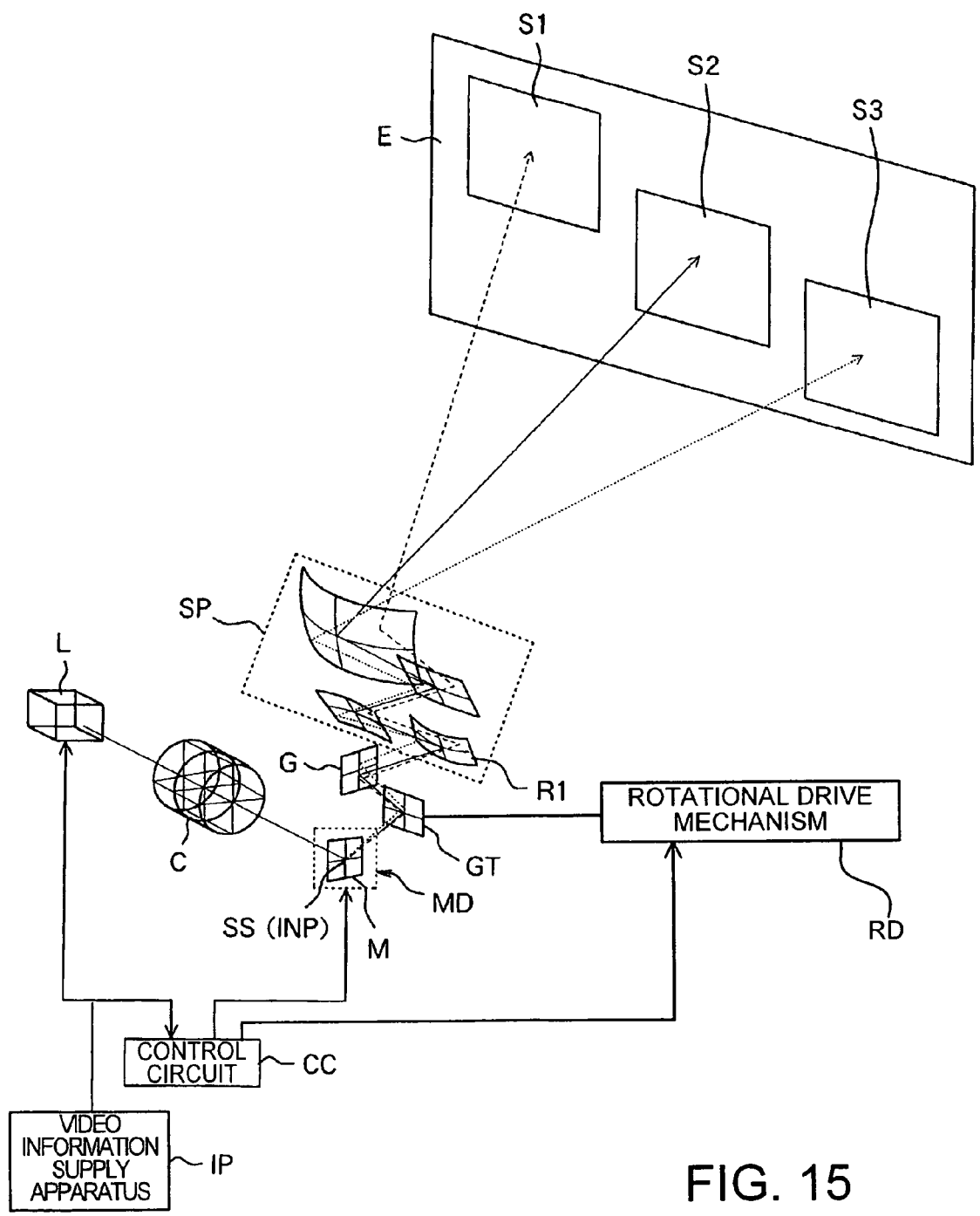
FIG. 15 is a diagram showing the construction of a scan type image display apparatus using a scan type display optical system according to Embodiment 2 of the present invention.

FIG. 15 shows the structure of a scan type image display apparatus using a scan type display optical system according to Embodiment 2 of the present invention. In this embodiment, described is a case where the reference surface normal direction of the optical scanning device MD (minute mirror M) is varied by a second galvanomirror GT.

In this embodiment, the modulated light is scanned in a predetermined one-dimensional direction (first direction: horizontal direction on the effective projection surface E) by the minute mirror (first mirror) M of the optical scanning device. MD, and scanned in a second direction (a vertical direction on the effective projection surface E) orthogonal to the first direction by a first galvanomirror (second mirror) G, whereby the scanning is two-dimensionally carried out on the inside of the light guide area to the projection optical system SP.

The movement of the light guide area (that is, the video image display position on the effective projection surface E) to (the first surface R1 of) the projection optical system SP is carried out by rotating the second galvanomirror GT around the entrance pupil INP of the projection optical system SP. The second galvanomirror GT is rotationally driven by a rotational drive mechanism RD containing a motor (not shown) and the rotational drive mechanism RD is controlled by the control circuit CC.

Here, during the scanning operation in the second direction, the normal galvanomirror makes a swing motion represented by a sine wave as shown in FIG. 8, and thus a difference in scanning speed occurs between the center portion and the peripheral portion of the swing motion. Therefore, according to the projection optical system SP of this embodiment, the scanning speed difference is corrected with respect to the second direction in the whole area of the effective projection surface E, and an excellent image (video image) is projected onto the effective projection surface E. However, it is difficult to correct the scanning speed difference over the whole area of the swing motion by the optical surface shape of the projection optical system SP. Therefore, only a swing motion area represented by a heavy line in FIG. 8 is used for light scanning, and the scanning speed difference at this time is corrected by the projection optical system SP. In this case, correction is carried out on the effective projection surface E.

Figure 16:
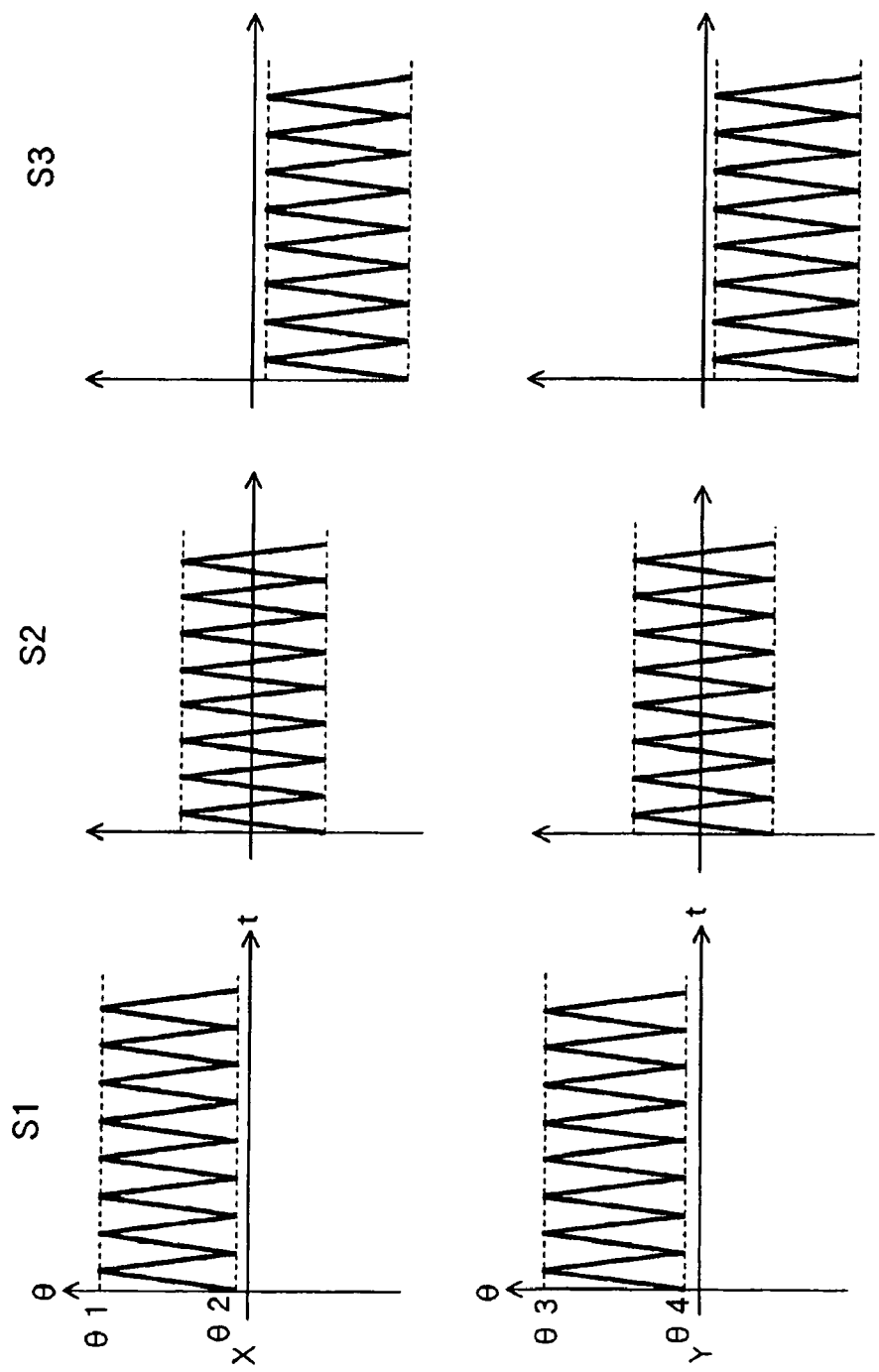
FIG. 16A and FIG. 16B are diagrams showing the swing waveforms of the minute mirror and the galvanomirror in different reference surface normal directions in Embodiment 2.

When the correction is carried out, the correction based on the projection optical system SP is also effective in a case where the area for projecting the modulated light to the effective projection surface E is moved in the second direction, so that the modulated light is scanned by the optical scanning device MD, and also the light guide area to the projection optical system SP is moved by rotating the second galvanomirror GT, whereby the position of the two-dimensional image surface S on the effective projection surface E can be moved. FIG. 16A and FIG. 16B show the swing waveforms of the minute mirror M and first galvanomirror G in the optical scanning device MD respectively. In FIG. 16A and FIG. 16B, each abscissa axis represents the time, and each ordinate axis represents the swing angles of the minute mirror M and the first galvanomirror G. The swing waveforms of the minute mirror M and first galvanomirror G are originally sine waves. However, in this case, they are illustrated as shown in the figures for simplification.

As is apparent from FIG. 16A and FIG. 16B, the reference surface normal direction of the minute mirror M is varied, whereby the reference position of the swing motion of the minute mirror M is varied in accordance with the positions of the two-dimensional video images S1 to S3 on the effective projection surface E. The same is satisfied for the first galvanomirror G.

Furthermore, the scan timing of the modulated light by the minute mirror M, the rotation timing of the second galvanomirror GT and the input timing of the video signal from the video information supply apparatus IP to the modulated light emitting device L are synchronized with one another by the control circuit CC, whereby a plurality of areas on the effective projection surface E can be scanned with the modulated light and a plurality of two-dimensional video images S1 to S3 can be displayed on the effective projection surface E.

The principle for displaying a plurality of two-dimensional video images is the same as described with respect to Embodiment 1. However, according to this embodiment, the reference surface normal direction of the minute mirror M itself is not varied, that is different from Embodiment 1, but the reference surface normal direction is varied by the second galvanomirror GT, and the two-dimensional scanning of modulated light is carried out by the minute mirror M and the first galvanomirror G in each reference surface normal direction. When different reference surface normal directions are set, respective different video signals are input to the modulated light emitting device L.

When the second galvanomirror GT is rotated so as to be deviated from the surface containing an incident light ray and a reflected light ray (in this embodiment, the rotation for varying the reference surface normal direction to the second direction) at the time of the reflection of the reference axial light ray by the second galvanomirror GT, the shape of the light guide area for guiding the modulated light to the projection optical system SP and the second galvanomirror GT are set in a twisted relationship with each other, so that the image on the effective projection surface E is rotated within the effective projection surface E. In order to correct this, the light guide area for guiding the modulated light to the projection optical system SP is rotated in advance by the minute mirror M so as to offset the rotation caused by the twisting on the effective projection surface E.

When it is difficult to carry out the above operation, the second galvanomirror GT may be divided into a galvanomirror rotating only in the first direction and a galvanomirror rotating only in the second direction.

The projection optical system SP used in this embodiment is the same as the projection optical system SP of Embodiment 1. The size of the effective projection surface E is equal to 304.8×812.8 mm.

The size of the image surface S is set to any value on the effective projection surface E by the light guide area for the projection optical system SP, and thus an example will be described below. At this time, a projection angle will also be described. When the image surface S is set to have a size of 20 inches of 3:4 in aspect ratio (304.8×406.4 mm), the corrected projection angle range (that is, the range in which the image surface S can be tilted) represented by the angle formed between the normal line of the effective projection surface E and the reference axis described above is represented as follows:

qx: −22.12° to +22.12°
qy: +23.43°

The swing angle in the first direction of the minute mirror M is equal to ±6.12°, and the swing angle in the second direction of the first galvanomirror G is equal to ±3.30°. Furthermore, when the overall area of the effective projection surface E is scanned, the swing angle in the first direction of the minute mirror M is equal to ±12.24°, and the swing angle in the second direction of the galvanomirror G is equal to ±3.30°.

Furthermore, in the case of an image surface S of 20 inches, qy is fixed. However, if the size thereof is less than 20 inches, the video image display position can be also moved in the qy direction. For example, in the case of an image surface of 15 inches, the corrected projection angle range is represented as follows:

qx: −26.93° to +26.93°
qy: −19.64° to +26.99°

Embodiment 3

Figure 17:
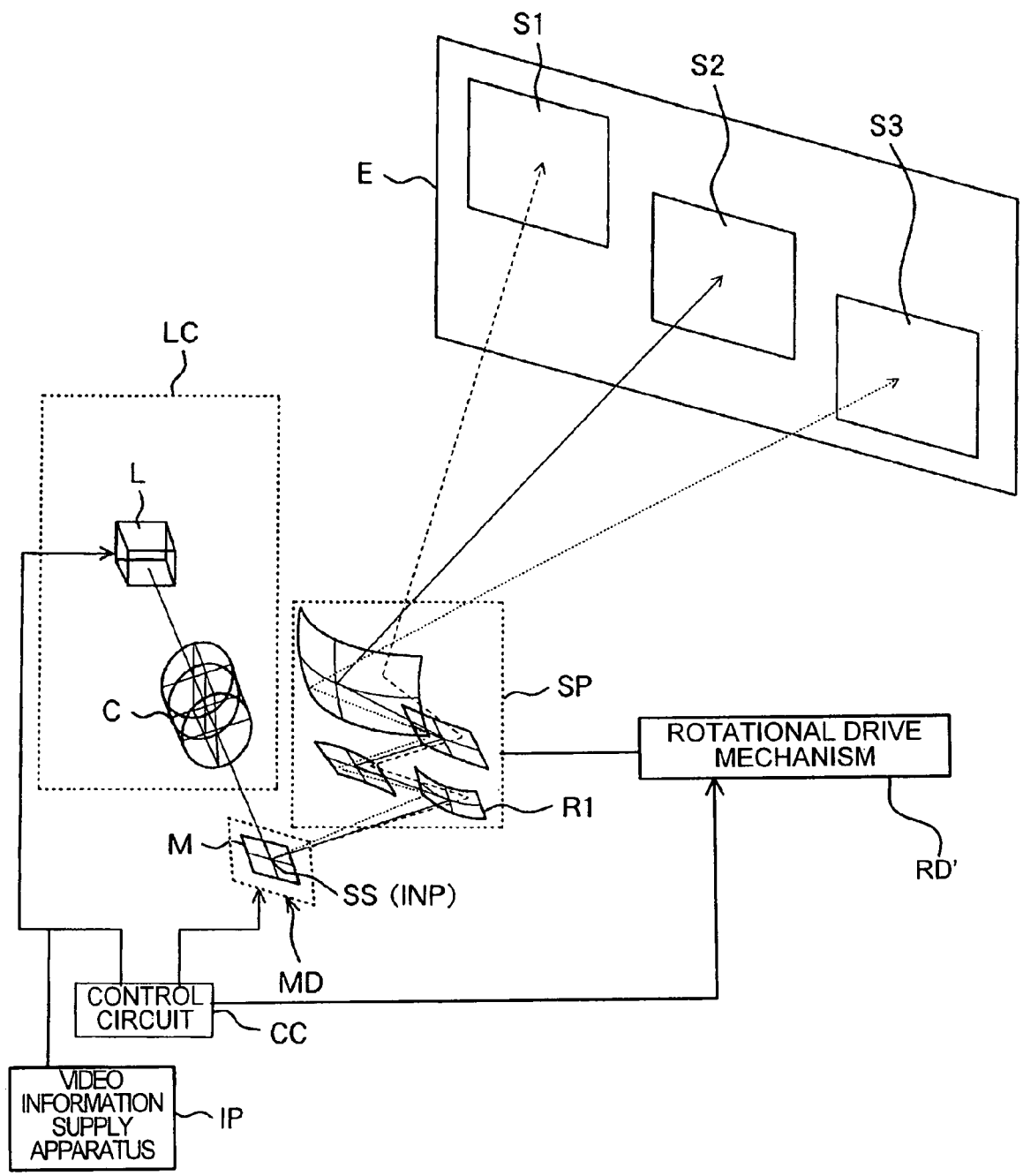
FIG. 17 is a diagram showing the construction of a scan type image display apparatus using a scan type display optical system of Embodiment 3 of the present invention.

FIG. 17 shows the structure of a scan type image display apparatus using a scan type display optical system according to Embodiment 3 of the present invention. In this embodiment, as the optical scanning device MD such a type is used where the minute mirror M (first and second mirrors) is swung in two-dimensional directions of a predetermine one-dimensional direction (first direction:horizontal direction on the effective projection surface E) and a second direction (vertical direction on the effective projection surface E) orthogonal to the first direction.

Figure 18:
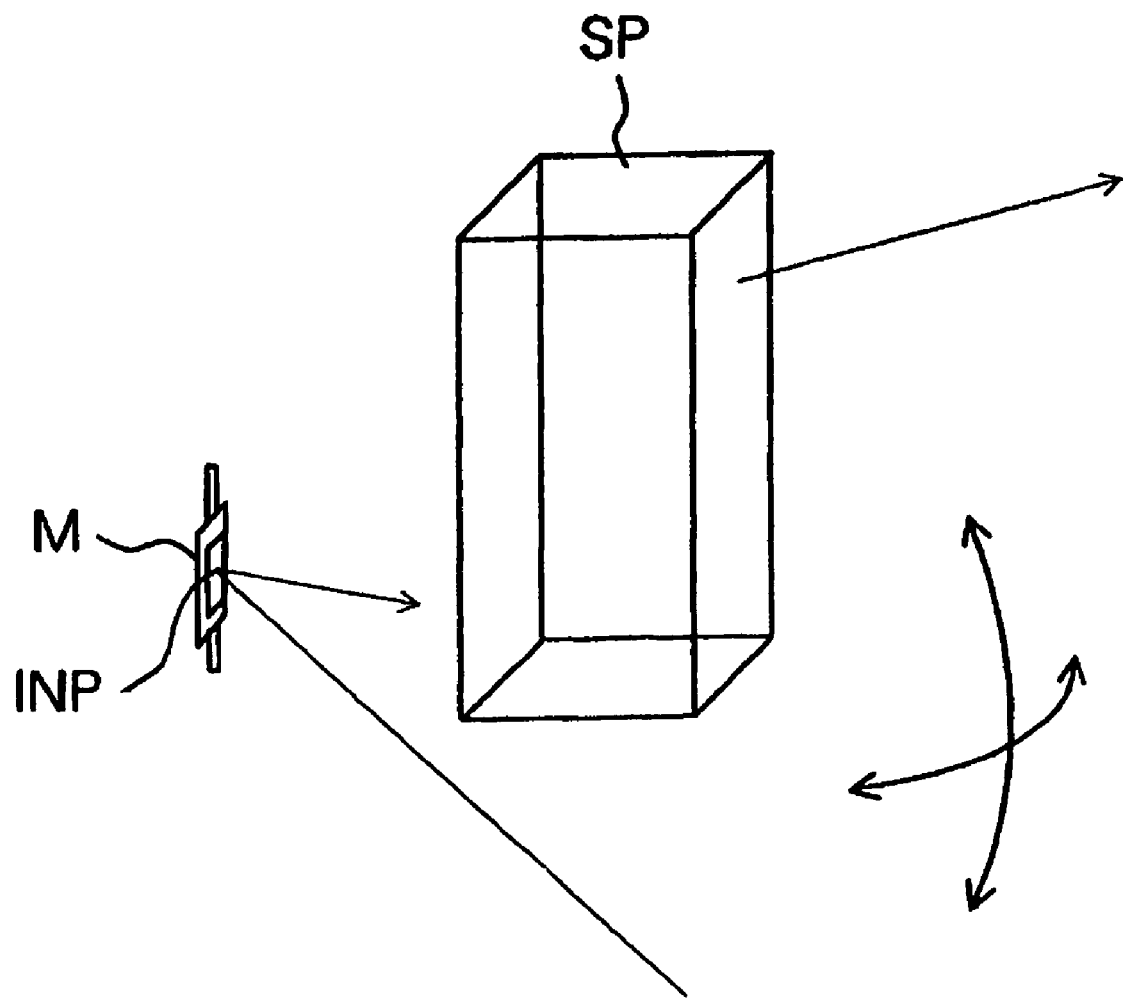
FIG. 18 is a diagram showing rotation of a projection optical system in the scan type display optical system according to Embodiment 3.

The reference surface normal direction of the optical scanning device MD (minute mirror M) is varied by rotating the projection optical system SP around the entrance pupil INP of the projection optical system SP, whereby the light guide area for (the first surface R1 of) the projection optical system SP is moved, and the video image display position on the effective projection surface E is moved. FIG. 18 shows the state where the projection optical system SP is rotated around the entrance pupil INP of the projection optical system SP. As shown in FIG. 17, the projection optical system SP is rotationally driven by a rotation drive mechanism RD' containing a motor (not shown), and the rotation drive mechanism RD' is controlled by the control circuit CC.

According to this embodiment, two-dimensional video images S1 to S3 can be projected to any position on the effective projection surface E according to the principle described above as shown in FIG. 17.

Here, rotation of the projection optical system SP around the entrance pupil INP of the projection optical system SP is equivalent to the rotation of the light source optical system LC containing the modulated light emitting device L and the collimator lens C around the entrance pupil INP of the projection optical system SP.

Furthermore, by rotating the projection optical system SP (or the light source optical system LC), the deflected light from the minute mirror M scans the plurality of light guide areas of (the first surface R1 of) the projection optical system SP, and the input timing of the video image signal from the video information supply apparatus IP to the modulated light emitting device L and the operation of the minute mirror M are synchronized with each other by the control circuit CC, whereby a plurality of images can be simultaneously displayed on the effective projection surface E.

Figure 19:
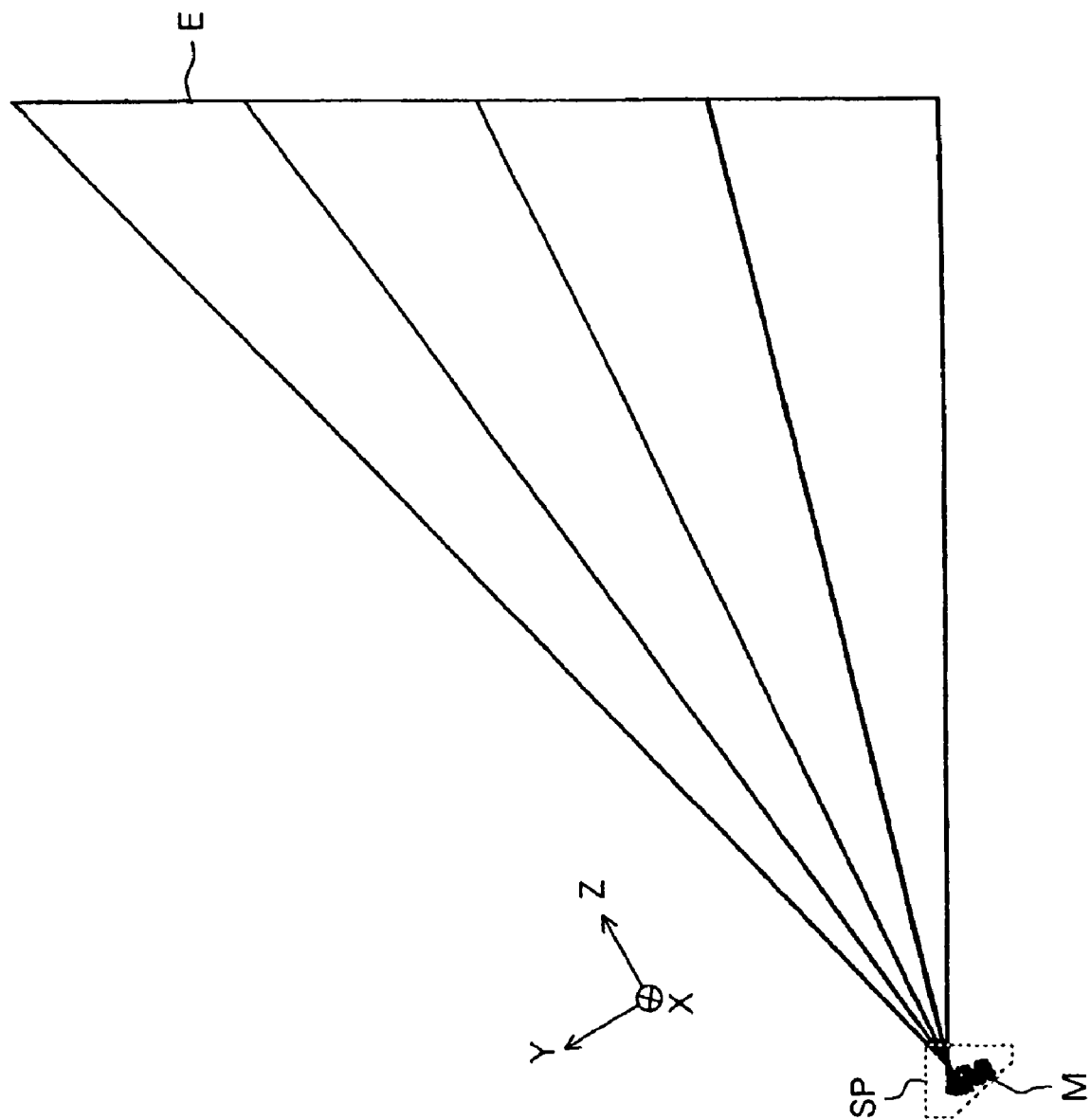
FIG. 19 is a diagram showing the aspect of projection to an effective projection surface by the scan type display optical system of Embodiment 3.
Figure 20:
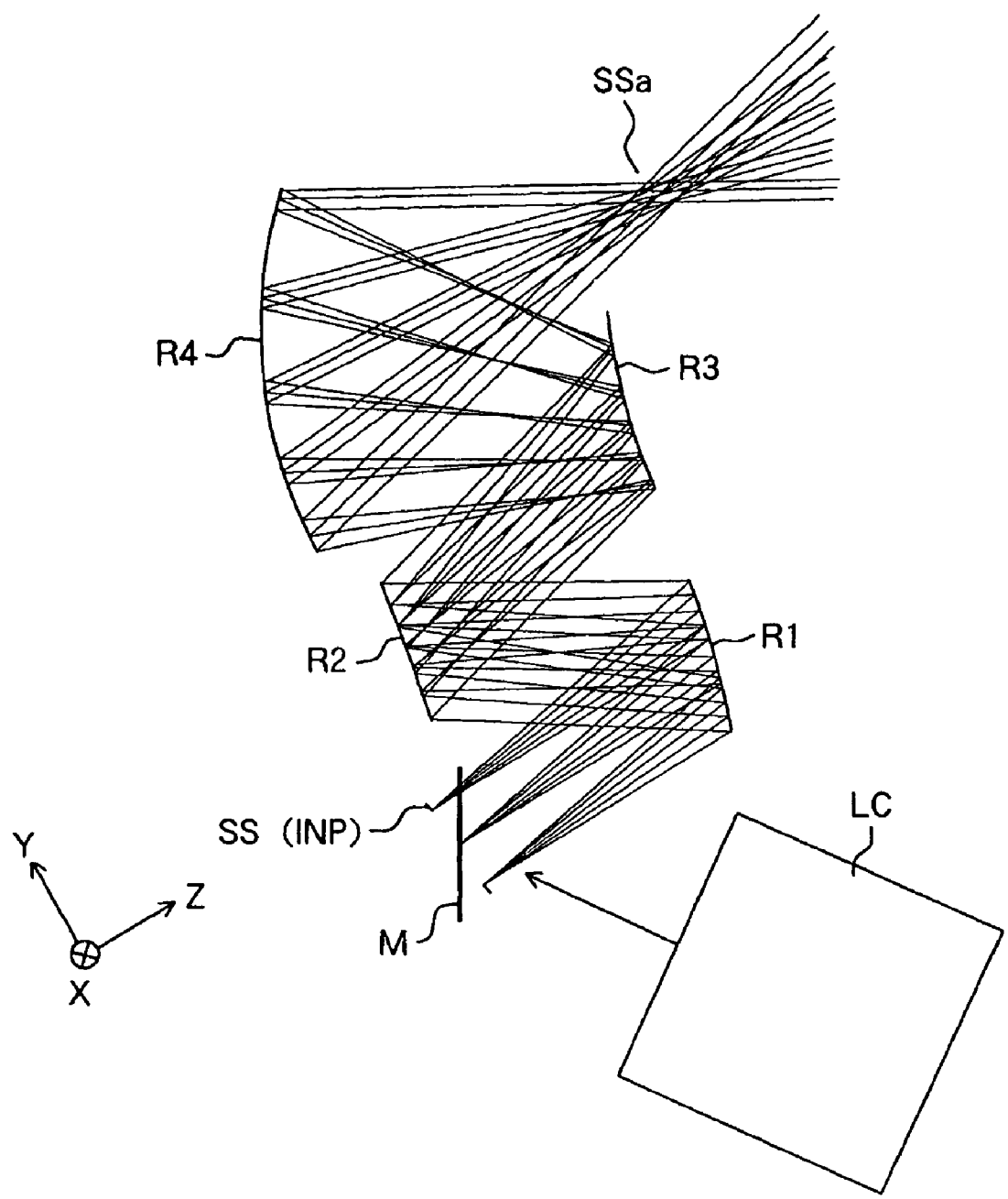
FIG. 20 is a diagram showing the construction of the scan type display optical system of Embodiment 3.

Next, details of the scan type display optical system according to this embodiment will be described with reference to FIG. 19 and FIG. 20. FIG. 19 shows the aspect of projection of the modulated light to the effective projection surface E by the scan type display optical system according to the embodiment, and FIG. 20 is an enlarged view of the light source optical system LC containing the modulated light emitting device L and the collimator lens C, the minute mirror M of the optical scanning device MD and the projection optical system SP. The collimated modulated light is incident from the light source optical system LC (collimator lens C) to the minute mirror M.

In this embodiment, the minute mirror M is disposed at the entrance pupil (aperture stop) position SS (INP) of the projection optical system SP.

R1 to R4 represent four reflective surfaces as four optical surfaces constituting the projection optical system SP, and air is filled in the gap between the respective reflective surfaces R1 to R4. The reflective surfaces R1 to R4 are formed of rotational asymmetric aspheric surfaces.

The projection optical system SP as the Off-Axial optical system containing the reflective surfaces as the rotational asymmetric aspheric surfaces is a projection optical system using an Off-Axial system for guiding to the effective projection surface E shown in FIG. 19 the light which is modulated by the modulated light emitting device L, passed through the collimator lens C and deflected and scanned by the minute mirror M, and forming a two-dimensional video image on the effective projection surface E. SSa in FIG. 20 represents an exit pupil of the projection optical system SP.

In FIG. 19, light rays are displayed over the whole area of the effective projection surface E, and this means that the projection optical system SP guarantees the optical performance of the whole area, and a video image is actually displayed in a partial area on the effective projection surface E in conformity with an area for guiding light to (the first surface R1 of) the projection optical system SP by the minute mirror M.

The size of the effective projection surface E is equal to 433.3×1006.7 mm. The size of the image surface S is set to any value on the effective projection surface E in accordance with the area for guiding light to the projection optical system SP as described above, and thus an example will be described hereunder. At this time, a projection angle will also be described. When the image surface S is assumed to have a size of 20 inches of 0.3:4 in aspect ratio (304.8×406.4 mm), the corrected projection angle range (that is, the range in which the image surface S can be tilted) represented by the angle formed between the normal line of the effective projection surface E and the reference axis described above is as follows:

qx: −30.96° to +30.96° qy: +16.960 to +29.33°

The swing angle in the first direction of the minute mirror M is equal to ±4.94°, and the swing angle in the second direction is equal to ±3.72°.

Furthermore, when the overall area of the effective projection surface E is scanned, the swing angle in the first direction of the minute mirror M is equal to ±12.24°, and the swing angle in the second direction is equal to ±5.27°.

The data showing the structure of the scan type display optical system of this embodiment is shown below. In these data, Ndi and vdi are the same as Embodiment 1, and thus the description thereof is omitted.

Entrance pupil diameter 3 mm
Variable projection angle range
qx: −30.96°~+30.96° qy: +16.96°~+29.33°

| Surface i | Yi | Zi | Di | θx, i | |
|---|---|---|---|---|---|
| 1 | 0.00 | 0.00 | 10.00 | 0.00 | Aperture stop/Minute mirror |
| 2 (R1) | 0.00 | 10.00 | 10.00 | 20.00 | Reflective surface |
| 3 (R2) | −6.43 | 2.34 | 10.00 | −24.31 | Reflective surface |
| 4 (R3) | −7.93 | 12.23 | 12.00 | 26.20 | Reflective surface |
| 5 (R4) | −16.23 | 3.56 | 500.00 | −16.50 | Reflective surface |
| 6 | 77.29 | 494.74 | 23.43 | | Image surface |

Aspheric shape

| Surface | | | |
|---|---|---|---|
| R1 | C02 = −1.14698e−002 | C20 = −1.47647e−002 | |
| | C03 = 2.61803e−004 | C21 = 2.83124e−004 | |
| | C04 = 8.76106e−006 | C22 = 1.56878e−005 | C40 = −3.00120e−006 |
| | C05 = 4.68265e−007 | C23 = 5.37654e−006 | C41 = 2.65682e−006 |
| | C06 = −3.62535e−007 | C24 = 5.74255e−007 | C42 = 8.82485e−007 |
| | C60 = 2.27647e−007 | | |
| R2 | C02 = −3.77624e−003 | C20 = −1.24281e−002 | |
| | C03 = 1.28459e−003 | C21 = 1.93663e−003 | |
| | C04 = −3.07144e−005 | C22 = −4.84910e−006 | C40 = 9.15597e−007 |
| | C05 = 3.06335e−008 | C23 = 1.96314e−007 | C41 = −2.16124e−006 |
| | C06 = −1.11420e−006 | C24 = 1.62664e−007 | C42 = 2.33015e−006 |
| | C60 = 9.91494e−007 | | |
| R3 | C02 = 2.45866e−002 | C20 = 3.07572e−002 | |
| | C03 = 1.66644e−004 | C21 = 1.90149e−003 | |
| | C04 = −2.44830e−004 | C22 = −1.23575e−004 | C40 = −4.47202e−005 |
| | C05 = 3.24764e−006 | C23 = −5.56495e−005 | C41 = −2.12673e−005 |
| | C06 = 6.84126e−006 | C24 = −7.62426e−006 | C42 = 7.90017e−009 |
| | C60 = −2.39120e−006 | | |

-continued

Entrance pupil diameter 3 mm
Variable projection angle range
qx: −30.96°~+30.96° qy: +16.96°~+29.33°

| | | | |
|---|---|---|---|
| R4 | C02 = 3.00715e−002 | C20 = 3.17079e−002 | |
| | C03 = −1.49194e−004 | C21 = −1.56115e−004 | |
| | C04 = 1.24352e−005 | C22 = 3.81478e−005 | C40 = 1.93389e−005 |
| | C05 = −9.15325e−008 | C23 = −3.33463e−007 | C41 = −2.42578e−007 |
| | C06 = 1.67219e−007 | C24 = 1.89644e−007 | C42 = 1.59822e−007 |
| | C60 = 5.37644e−008 | | |

Next, the optical action of this embodiment will be described. In the scan type display optical system of this embodiment, the two-dimensional image surface can be moved and tilted on the effective projection surface E. Positions represented by numerals 1 to 5 each of which is encircled are provided as evaluation positions at which the lateral aberration is evaluated on the effective projection surface E (image surface S). With respect to the performance required of the projection optical system SP, desired performance may be secured on the effective projection surface E for light rays when the minute mirror M is swung in the first direction at ±12.24° and in the second direction at ±5.27°.

Figure 21:
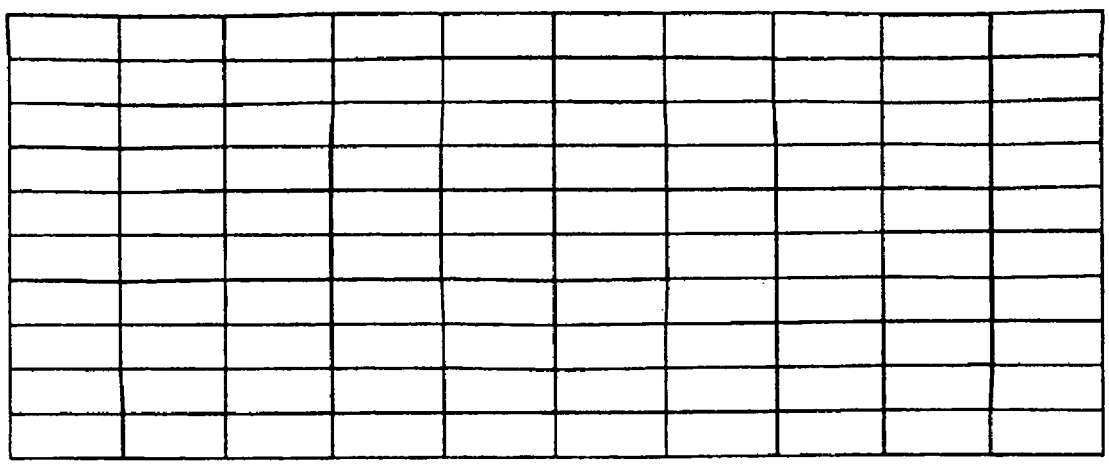
FIG. 21 is a diagram showing distortion in the scan type display optical system according to Embodiment 3.
Figure 22:
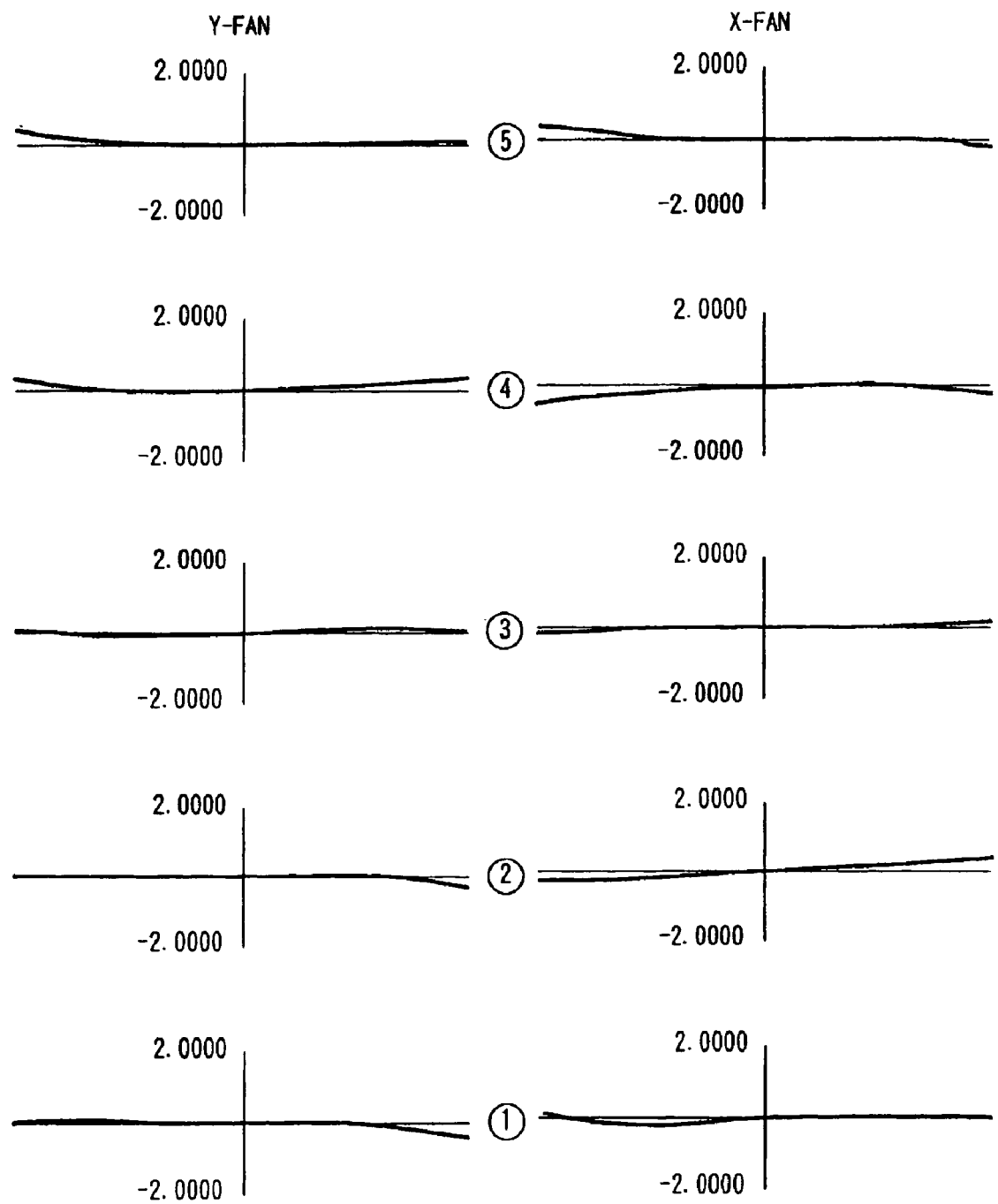
FIG. 22 is a diagram showing the lateral aberration in the scan type display optical system according to Embodiment 3.

The aspect of distortion on the effective projection surface E in this embodiment is shown in FIG. 21, and the lateral aberration graphs at the evaluation positions of 1 to 5 of FIG. 5 are shown in FIG. 22. In the lateral aberration graphs of FIG. 22, the abscissa axis represents x-axis or y-axis on the pupil surface, and the ordinate axis represents an aberration amount on the effective projection surface E.

As is apparent from FIG. 21, no large distortion occurs in the projection image (video image) and little asymmetric distortion occurs. Furthermore, as is apparent from FIG. 22, the modulated light projected to the effective projection surface E is excellently formed an image with little aberration.

Embodiment 4

Figure 23:
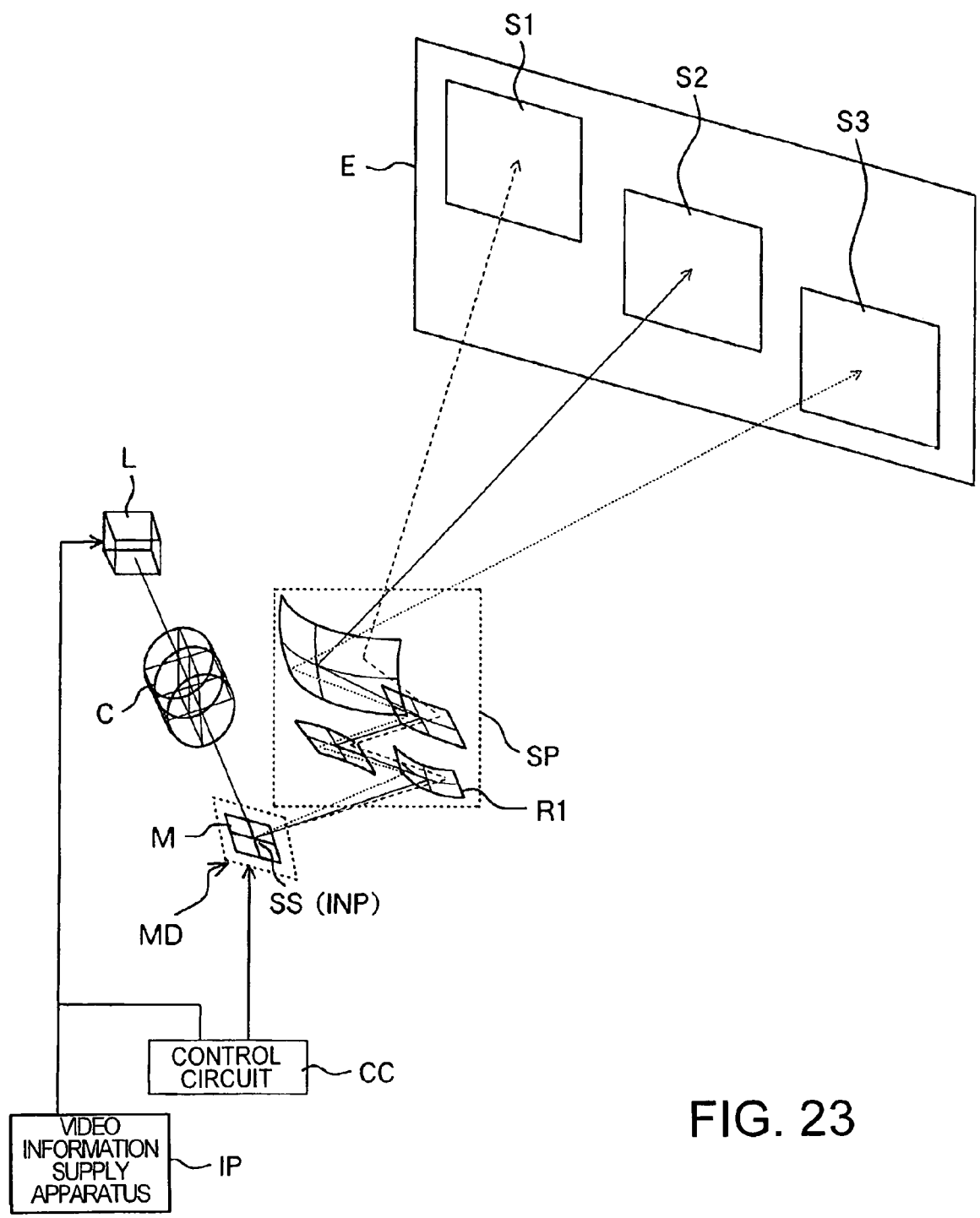
FIG. 23 is a diagram showing the construction of a scan type image display apparatus using a scan type display optical system according to Embodiment 4 of the present invention.

FIG. 23 shows the structure of a scan type image display apparatus using a scan type display optical system according to Embodiment 4 of the present invention. In this embodiment, the reference surface normal direction of the minute mirror M of the optical scanning device MD is electrically varied, whereby the light guide area to (the first surface R1 of) the projection optical system SP is moved and the video image display position on the effective projection surface E is moved.

FIG. 16A shows an aspect that the minute mirror M is swung while varied in the reference surface normal direction in this embodiment as in the case of Embodiment 2.

According to this embodiment, two-dimensional video images S1 to S3 can be projected to any position on the effective projection surface E according to the principle described above.

Furthermore, by varying the reference surface normal direction of the minute mirror M, the deflected light from the minute mirror M is scanned on a plurality of light guide areas of (the first surface R1 of) the projection optical system SP. The input timing of a video signal from the video information supply apparatus IP to the modulated light emitting device L is synchronized with the operation of the minute mirror M by the control circuit CC, whereby a plurality of images (video images) can be simultaneously displayed on the effective projection surface E.

Figure 24:
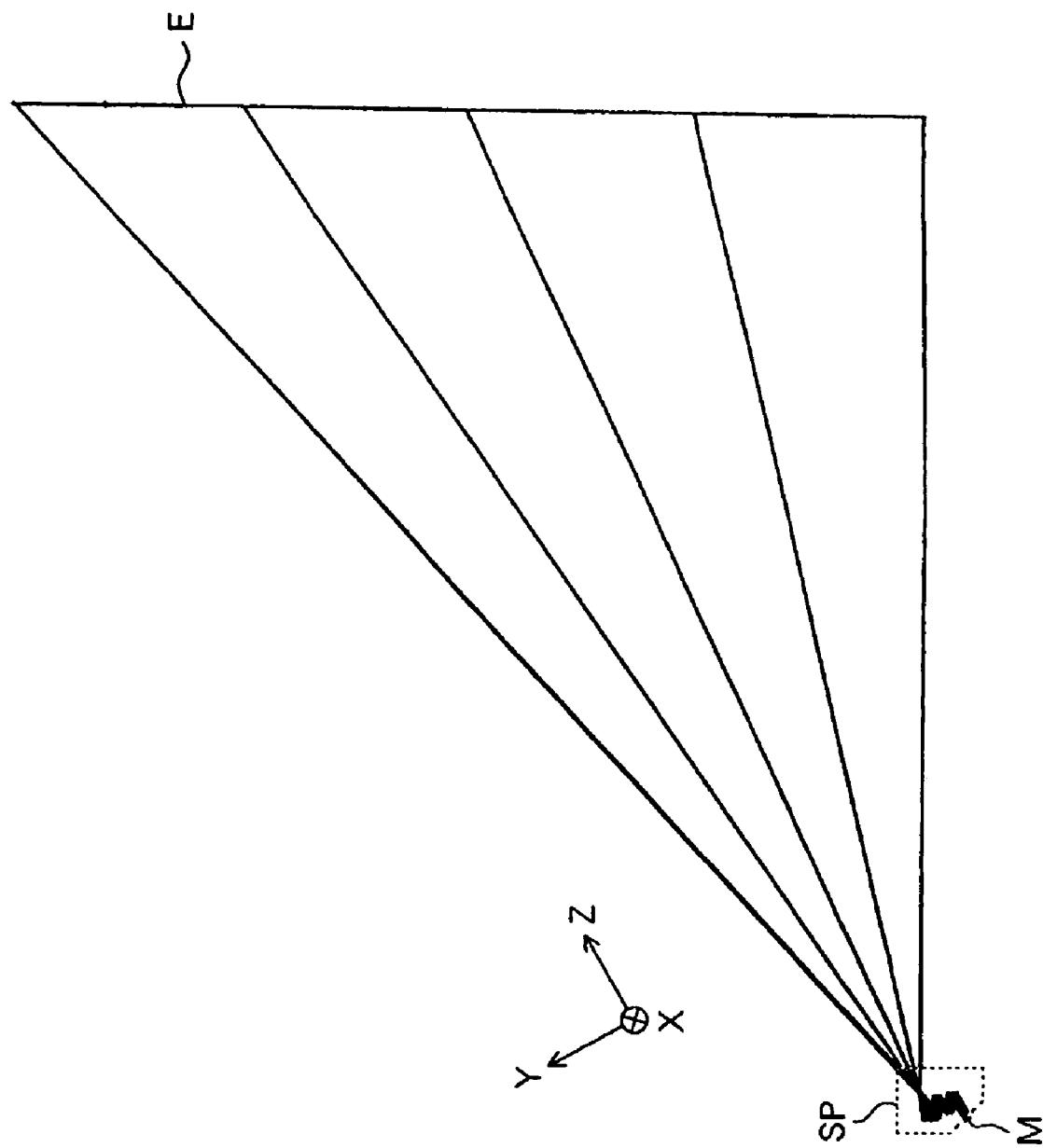
FIG. 24 is a diagram showing the aspect of projection to an effective projection surface by the scan type display optical system according to Embodiment 4.
Figure 25:
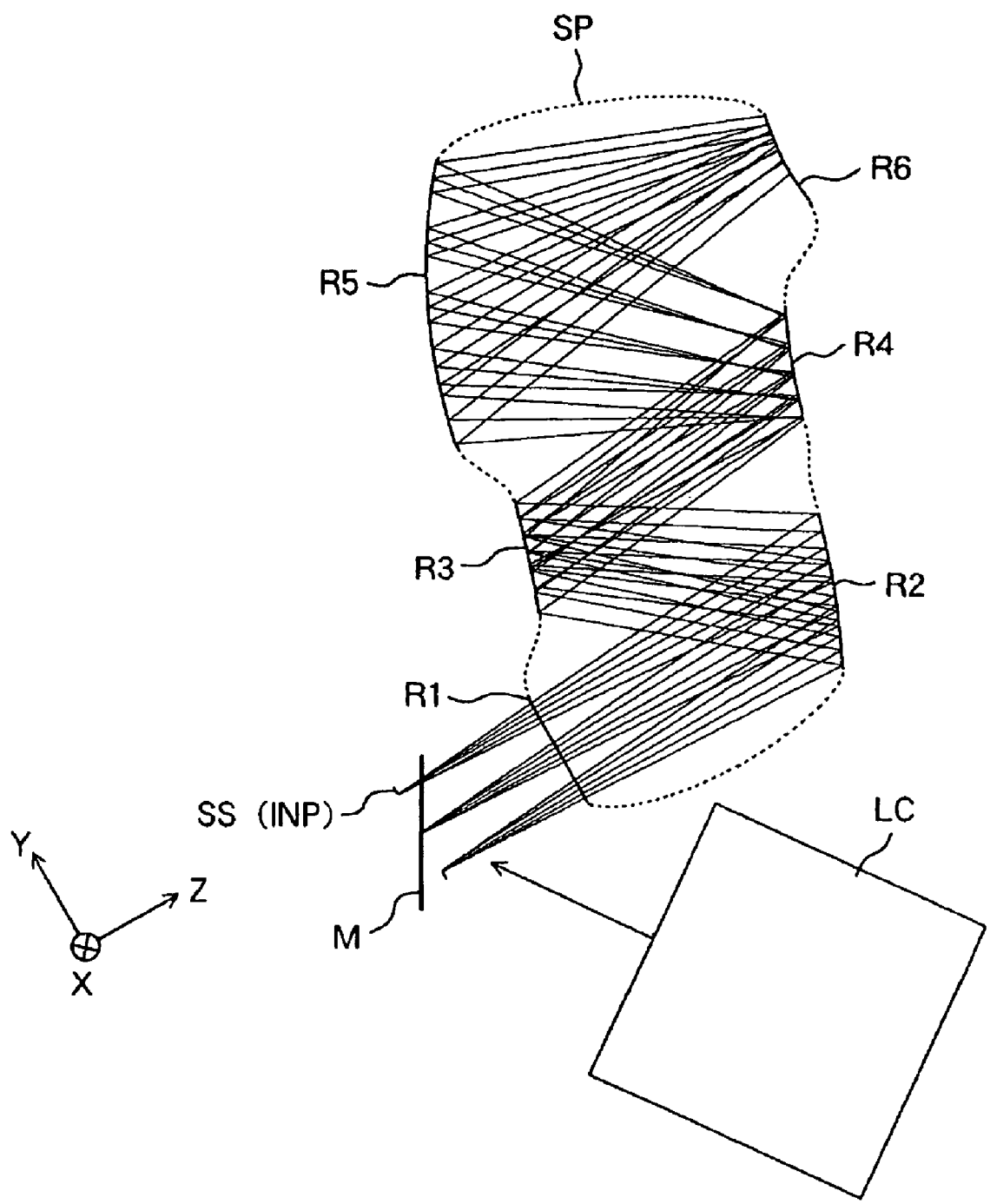
FIG. 25 is a diagram showing the construction of the scan type display optical system of Embodiment 4.

Next, the details of the scan type display optical system according to this embodiment will be described with reference to FIG. 24 and FIG. 25. FIG. 24 shows the aspect of projection of the modulated light to the effective projection surface E by the scan type display optical system of this embodiment, and FIG. 25 is an enlarged view of the light source optical system LC containing the modulated light emitting device L and the collimator lens C, the minute mirror M of the optical scanning device MD and the projection optical system SP. The collimated modulated light from the light source optical system LC (collimator lens C) is incident to the minute mirror M.

In this embodiment, the minute mirror M is disposed at the entrance pupil (aperture stop) position SS of the projection optical system SP.

Furthermore, R1 to R6 represent six optical surfaces constituting the projection optical system SP, and these optical surfaces R1 to R6 are formed on an integral type optical element having a prism shape in which optical glass is filled. R1 and R6 denote refractive surfaces to/from which light rays enter and emerge, and the refractive surfaces are formed of rotational asymmetrical aspheric surfaces. R2 to R5 denote reflective surfaces, and are formed of rotational asymmetrical aspheric surfaces.

The projection optical system SP as the Off-Axial optical system containing the reflective surfaces as the rotational asymmetric aspheric surfaces is a projection optical system using the Off-Axial system for guiding to the effective projection surface E shown in FIG. 24 the light which is modulated in the modulated light emitting device L, passed through the collimator lens C and deflected and scanned by the minute mirror M, and forming a two-dimensional video image on the effective projection surface E.

In FIG. 24, the light rays are displayed over the whole area of the effective projection surface E, and this means that the projection optical system SP guarantees the optical performance of the whole area. In actuality, a video image is displayed in a partial area on the effective projection surface E in conformity with a light guiding area to (the first surface R1 of) the projection optical system SP by the minute mirror M.

The size of the effective projection surface E is equal to 433.3×1006.7 mm. The size of the image surface S is set to any value on the effective projection surface E in conformity with the light guide area to the projection optical system SP as described above, and thus an example will be described hereunder. At this time, a projection angle will also be described. When the image surface S has a size of 20 inches of 3:4 in aspect ratio (304.8×406.4 mm), the corrected projection angle range (that is, the range in which the image surface S can be tilted) represented by the angle formed between the normal line of the effective projection surface E and the reference axis is as follows:

$q_x$: −30.96° to +30.96°
$q_y$: +16.96° to +29.33°

The swing angle in the first direction of the minute mirror M is equal to ±4.94°, and the swing angle in the second direction is equal to ±3.72°.

When the overall area of the effective projection surface E is scanned, the swing angle in the first direction of the minute mirror M is equal to ±12.24°, and the swing angle in the second direction is equal to ±5.27°.

The data showing the structure of the scan type display optical system of this embodiment is shown below.

ation positions for evaluating the lateral aberration on the effective projection surface E (image surface S). With respect to the performance required of the projection optical system SP, it is sufficient insofar as desired performance is secured on the effective projected area E for light rays when the minute mirror M is swung in the first direction at ±12.24° and swung in the second direction at ±5.27°.

Figure 26:
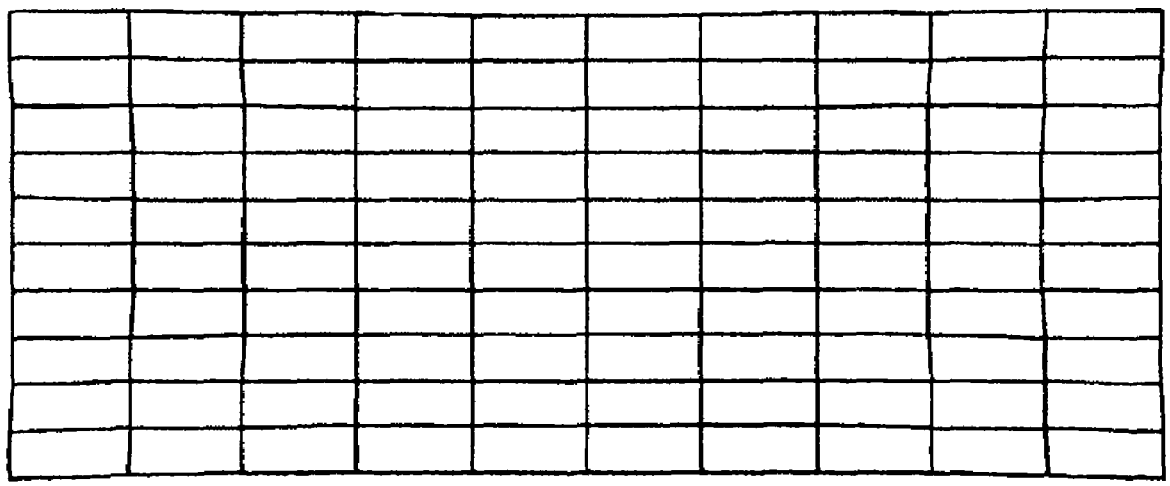
FIG. 26 is a diagram showing the distortion in the scan type display optical system according to Embodiment 4.

The aspect of distortion on the effective projection surface E in this embodiment is shown in FIG. 26, and the lateral aberration graphs at the evaluation positions of 1 to 5 of FIG.

Entrance pupil diameter 3 mm
Variable projection angle range
$q_x$: −30.96°~+30.96° $q_y$: +16.96°~+29.33°

| Surface i | $Y_i$ | $Z_i$ | $D_i$ | $\theta x, i$ | $N_{di}$ | $\nu_{di}$ | |
|---|---|---|---|---|---|---|---|
| 1 | 0.00 | 0.00 | 5.00 | 0.00 | 1 | | Aperture stop/Minute mirror |
| 2(R1) | 0.00 | 5.00 | 10.00 | 0.00 | 1.56093 | 62.55 | Transmissive surface |
| 3(R2) | 0.00 | 15.00 | 10.00 | 20.00 | 1.56093 | 62.55 | Reflective surface |
| 4(R3) | −6.43 | 7.34 | 10.00 | −21.86 | 1.56093 | 62.55 | Reflective surface |
| 5(R4) | −7.08 | 17.32 | 12.00 | 23.00 | 1.56093 | 62.55 | Reflective surface |
| 6(R5) | −15.15 | 8.44 | 12.00 | −18.40 | 1.56093 | 62.55 | Reflective surface |
| 7(R6) | −14.00 | 20.38 | 500.00 | 0.00 | 1 | | Transmissive surface |
| 8 | 33.76 | 518.10 | 23.43 | | 1 | | Image surface |

Aspheric surface

| Surface | | | |
|---|---|---|---|
| R1 | C02 = 5.08605e−003 | C20 = 1.12572e−003 | |
| | C03 = 1.73428e−003 | C21 = −8.18795e−004 | |
| | C04 = 3.23611e−004 | C22 = 1.92743e−004 | C40 = 2.22131e−006 |
| | C05 = 2.87755e−006 | C23 = 7.58765e−006 | C41 = −2.01046e−005 |
| | C06 = −2.56784e−006 | C24 = −4.74665e−007 | C42 = 3.65809e−006 |
| | C60 = −1.28932e−006 | | |
| R2 | C02 = −1.23451e−002 | C20 = −1.72589e−002 | |
| | C03 = 7.29854e−004 | C21 = 8.50784e−005 | |
| | C04 = 8.19669e−005 | C22 = 3.40601e−005 | C40 = 3.17541e−006 |
| | C05 = 6.38661e−006 | C23 = 2.22230e−006 | C41 = −3.22456e−006 |
| | C06 = 5.89639e−007 | C24 = 8.23832e−007 | C42 = 7.45790e−007 |
| | C60 = −4.38454e−008 | | |
| R3 | C02 = −9.81870e−003 | C20 = −2.74640e−002 | |
| | C03 = 3.75982e−003 | C21 = 2.20217e−003 | |
| | C04 = 6.64041e−005 | C22 = 3.56274e−004 | C40 = 2.13211e−004 |
| | C05 = −7.31653e−005 | C23 = −1.04748e−004 | C41 = −6.83491e−005 |
| | C06 = 7.27285e−006 | C24 = 7.42853e−006 | C42 = 1.50141e−005 |
| | C60 = −7.18961e−007 | | |
| R4 | C02 = 2.19064e−002 | C20 = 3.41315e−002 | |
| | C03 = 2.51338e−003 | C21 = 2.53949e−003 | |
| | C04 = 2.21613e−004 | C22 = 2.01248e−004 | C40 = 1.92071e−004 |
| | C05 = 1.92089e−005 | C23 = 3.23607e−005 | C41 = −1.17077e−005 |
| | C06 = −2.55132e−006 | C24 = −6.08272e−006 | C42 = 4.61526e−006 |
| | C60 = −9.69626e−006 | | |
| R5 | C02 = 2.86111e−002 | C20 = 2.98235e−002 | |
| | C03 = −1.76799e−004 | C21 = −1.22052e−004 | |
| | C04 = 1.79239e−005 | C22 = 3.46195e−005 | C40 = 1.66153e−005 |
| | C05 = 9.29143e−007 | C23 = 8.82037e−007 | C41 = 4.95579e−008 |
| | C06 = 1.00500e−007 | C24 = 2.06580e−007 | C42 = 1.62495e−007 |
| | C60 = 3.19427e−008 | | |
| R6 | C02 = 4.14148e−002 | C20 = 3.25266e−002 | |
| | C03 = −4.73810e−003 | C21 = −2.43031e−003 | |
| | C04 = 3.02738e−003 | C22 = 3.77780e−004 | C40 = −3.01440e−005 |
| | C05 = −4.88783e−004 | C23 = −4.02943e−005 | C41 = −3.16463e−005 |
| | C06 = 7.42021e−005 | C24 = −3.43148e−005 | C42 = 6.40989e−006 |
| | C60 = 4.14423e−007 | | |

Figure 27:
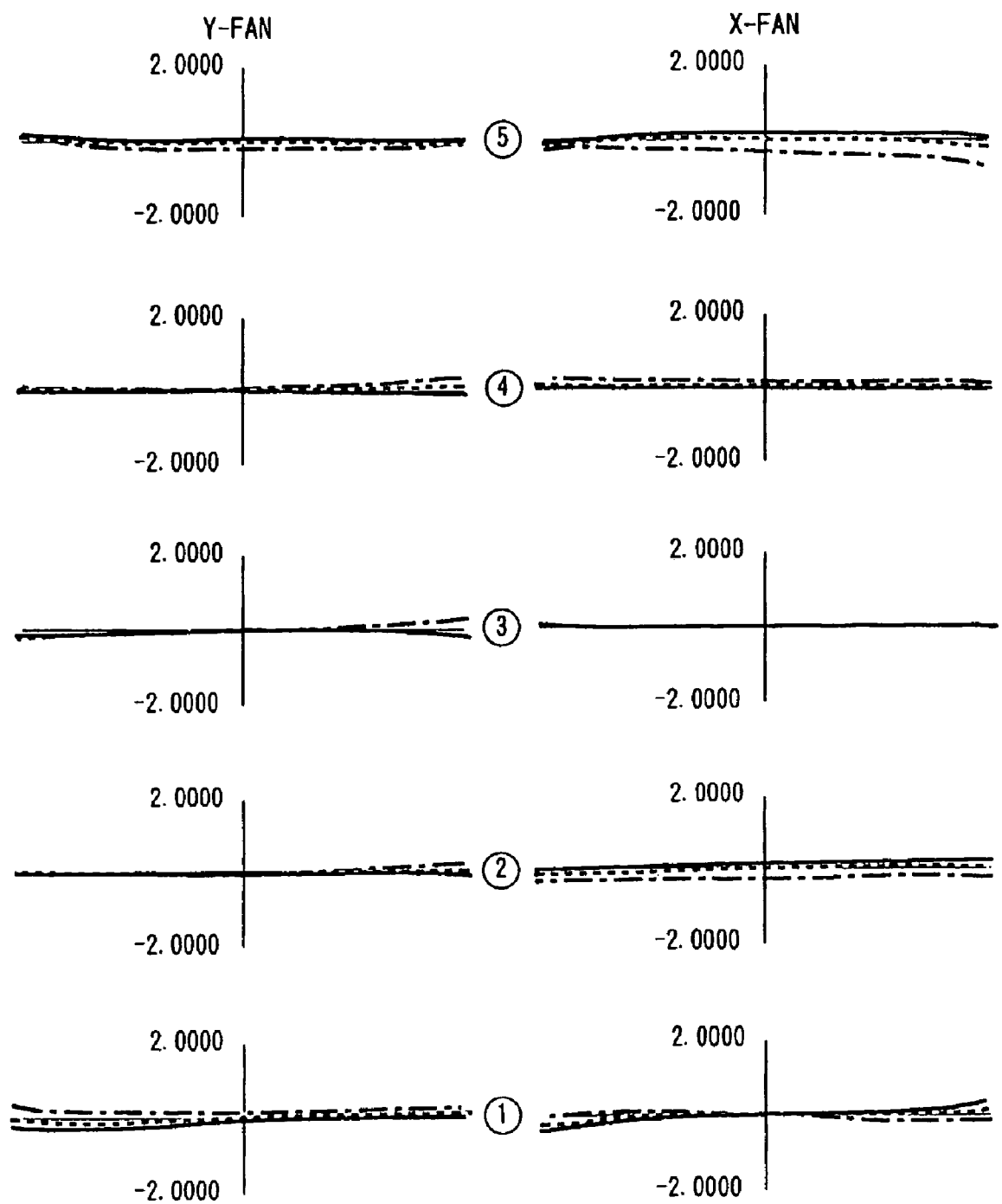
FIG. 27 is a diagram showing the lateral aberration in the scan type display optical system according to Embodiment 4.
Figure 28:
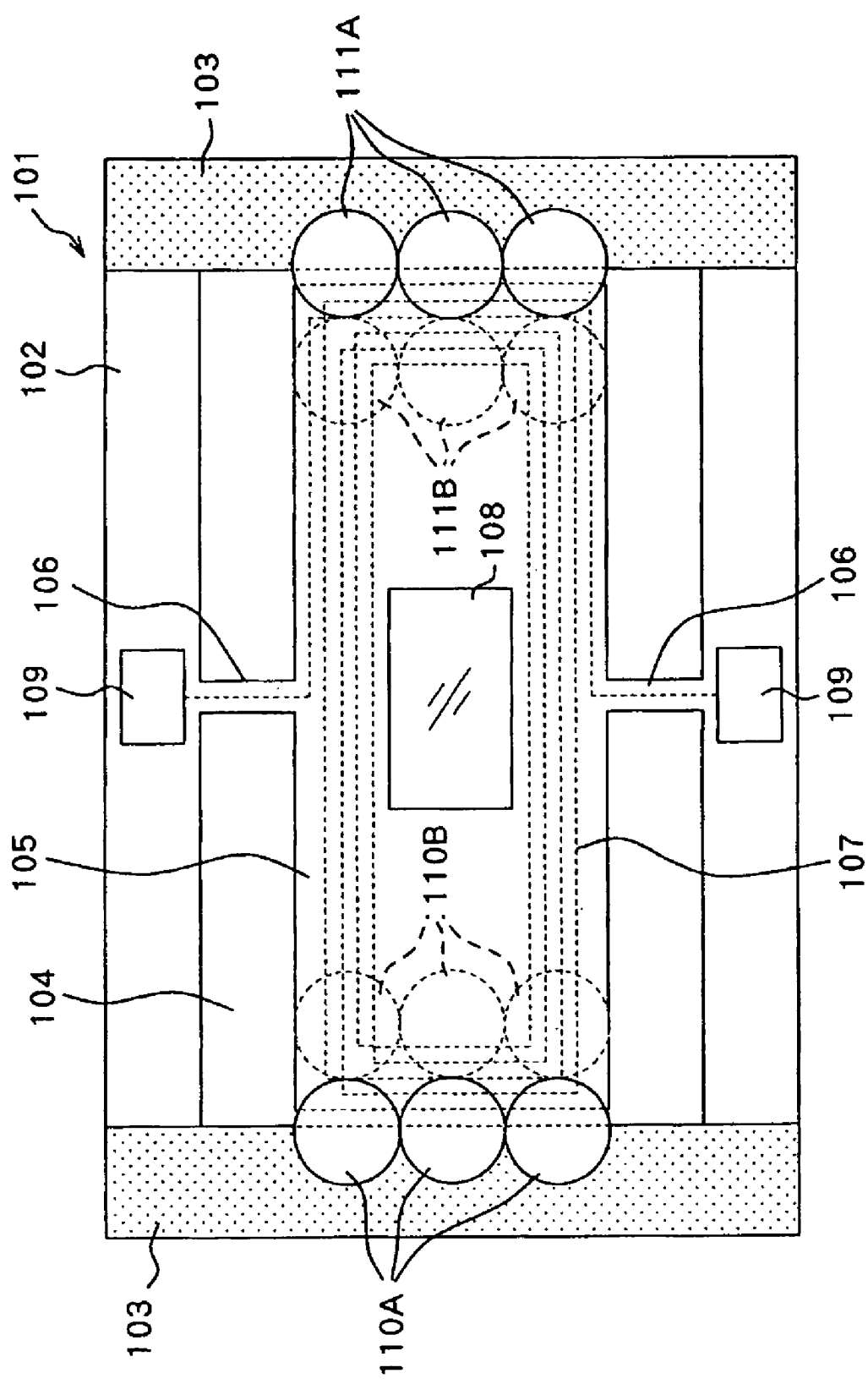
FIG. 28 is a diagram showing the construction of a planar type galvanomirror.

Next, the optical action of this embodiment will be described. The scan type display optical system of this embodiment can move and tilt the two-dimensional image surface on the effective projection surface E. The positions indicated by encircled numerals 1 to 5 are shown as evaluation 5 are shown in FIG. 27. In the lateral aberration graphs of FIG. 27, the abscissa axis represents x-axis or y-axis on the pupil surface, and the ordinate axis represents the aberration amount on the effective projection surface E. In FIG. 27, a solid line represents the lateral aberration of red color light, a broken line represents the lateral aberration of green color light and a chain line represents the lateral aberration of blue color light.

As is apparent from FIG. 26, no large distortion occurs in the projected image (video image), and little asymmetrical distortion occurs. Furthermore, as is apparent from FIG. 27, the modulated light projected to the effective projection surface E is excellently imaged with little aberration.

The structures of the various scan type display optical systems of the respective embodiments have been described, however, the structure of the scan type display optical system of the present invention is not limited to the above embodiments.

As described above, according to the respective embodiments, there can be implemented a scan type display optical system which can display an image having little distortion at any position or slant angle on the projection surface regardless of its compactness.

While preferred embodiments have been described, it is to be understood that modification and variation of the present invention may be made without departing from scope of the following claims.

What is claimed is:

1. A scan type display optical system which scans a projection surface with light, comprising:
   a mirror;
   a first driving mechanism which scans the projection surface with the light in a first direction by rotating the mirror;
   a second driving mechanism which rotates the first driving mechanism in the first direction; and
   a solid axle which connects the first driving mechanism and the second driving mechanism.

2. The scan type display optical system according to claim 1, further comprising a projection optical system which has a plurality of optical surfaces including a reflective surface and guides the light reflected by the mirror to the projection surface, wherein the mirror is substantially arranged at an entrance pupil position of the projection optical system.

3. The scan type display optical system according to claim 1, wherein the first driving mechanism resonantly swings the mirror.

4. The scan type display optical system according to claim 1, wherein the rotational axis of the mirror substantially coincides with the rotational axis of the first driving mechanism.

5. The scan type display optical system according to claim 1, further comprising a light guiding optical system which has a lens and guides the light to the mirror.

6. A scan type image display apparatus comprising:
   a modulation device modulating light; and
   a scan type display optical system according to claim 1, which scans a projection surface with the light modulated by the modulation device.

7. The scan type display optical system according to claim 1, further comprising a control circuit which controls the driving of the first and second driving mechanisms.

8. The scan type display optical system according to claim 1, further comprising a third driving mechanism which scans the projection surface with the light in a second direction orthogonal to the first direction,
   wherein a two-dimensional image is formed on the projection surface by driving the first and third driving mechanisms.

9. The scan type display optical system according to claim 8, wherein the display area of the two-dimensional image on the projection surface is moved by rotating the first driving mechanism through the second driving mechanism.

* * * * *